United States Patent
Gaal et al.

(10) Patent No.: US 11,863,325 B2
(45) Date of Patent: Jan. 2, 2024

(54) FINITE FIELD PARITY FOR FEEDBACK CODEBOOK

(71) Applicant: QUALCOMM Incorporated, San Diego, CA (US)

(72) Inventors: Peter Gaal, San Diego, CA (US); Alberto Rico Alvarino, San Diego, CA (US); Ayan Sengupta, San Diego, CA (US); Kazuki Takeda, Tokyo (JP); Le Liu, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 17/220,171

(22) Filed: Apr. 1, 2021

(65) Prior Publication Data

US 2022/0321271 A1    Oct. 6, 2022

(51) Int. Cl.
  *H04L 1/1812*    (2023.01)
  *H04B 7/0456*    (2017.01)
  *H04W 72/23*    (2023.01)

(52) U.S. Cl.
  CPC ......... *H04L 1/1812* (2013.01); *H04B 7/0456* (2013.01); *H04W 72/23* (2023.01)

(58) Field of Classification Search
  USPC ....................................................... 370/329
  See application file for complete search history.

(56) References Cited

U.S. PATENT DOCUMENTS

2020/0344010 A1* 10/2020 Lei ................... H04W 72/0446
2021/0226740 A1* 7/2021 Lei ....................... H04L 1/1864

FOREIGN PATENT DOCUMENTS

WO    WO-2021060958 A1 *    4/2021    ........... H04L 1/1607

OTHER PUBLICATIONS

3GPP TS 38.213 V16.5.0 (Mar. 2021), Physical layer procedures for control (Release 16) (Year: 2021).*
3GPP TSG RAN WG1 #98 R1-1908467 (Year: 2019).*
Samsung, HARQ enhancements for NR-U, 2019, 3GPP, R1-1904408 (Year: 2019).*
3GPP TS 38.213 V16.5.0, released in Mar. 2021 (Year: 2021).*

* cited by examiner

*Primary Examiner* — Jeffrey M Rutkowski
*Assistant Examiner* — Luna Weissberger
(74) *Attorney, Agent, or Firm* — Shumaker & Sieffert, P. A.

(57) ABSTRACT

Certain aspects of the present disclosure provide techniques for finite field parity for a hybrid automatic repeat request (HARQ) codebook. A method that may be performed by a base station (BS) includes indicating, to a user equipment (UE), a codebook for uplink transmission of HARQ feedback, the codebook based on: (i) a number (M) of candidate downlink transmission occasions for a time period, and (ii) a maximum number (k) of downlink transmissions the UE can receive during the time period. The method also includes selecting an action to perform based on a set of codepoints of the codebook, the set of codepoints comprising: (i) a first combination of codepoints, and (ii) a second combination of codepoints different from the first combination, wherein HARQ feedback calculated from the first combination is equal to HARQ feedback calculated from the second combination.

30 Claims, 11 Drawing Sheets

FINITE FIELD PARITY FOR FEEDBACK CODEBOOK

BACKGROUND

Field of the Disclosure

Aspects of the present disclosure relate to wireless communications, and more particularly, to techniques for reducing ambiguous hybrid automatic repeat request (HARQ) feedback.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly.

Certain aspects are directed to a method for wireless communication by a base station (BS). The method includes indicating, to a user equipment (UE), a codebook for uplink transmission of hybrid automatic repeat request (HARQ) feedback, the codebook based on: (i) a number (M) of candidate downlink transmission occasions for a time period, and (ii) a maximum number (k) of downlink transmissions the UE can receive during the time period. The method includes selecting an action to perform based on a set of codepoints of the codebook, the set of codepoints comprising: (i) a first combination of codepoints, and (ii) a second combination of codepoints different from the first combination, wherein HARQ feedback calculated from the first combination is equal to HARQ feedback calculated from the second combination.

Certain aspects are directed to a base station (BS). The BS includes a memory and a processor coupled to the memory. The processor and the memory configured to indicate, to a user equipment (UE), a codebook for uplink transmission of hybrid automatic repeat request (HARQ) feedback, the codebook based on: (i) a number (M) of candidate downlink transmission occasions for a time period, and (ii) a maximum number (k) of downlink transmissions the UE can receive during the time period. The processor and the memory configured to select an action to perform based on a set of codepoints of the codebook, the set of codepoints comprising: (i) a first combination of codepoints, and (ii) a second combination of codepoints different from the first combination, wherein HARQ feedback calculated from the first combination is equal to HARQ feedback calculated from the second combination.

Certain aspects are directed to an apparatus for wireless communication. The apparatus includes means for indicating, to a user equipment (UE), a codebook for uplink transmission of hybrid automatic repeat request (HARQ) feedback, the codebook based on: (i) a number (M) of candidate downlink transmission occasions for a time period, and (ii) a maximum number (k) of downlink transmissions the UE can receive during the time period. The apparatus includes means for selecting an action to perform based on a set of codepoints of the codebook, the set of codepoints comprising: (i) a first combination of codepoints, and (ii) a second combination of codepoints different from the first combination, wherein HARQ feedback calculated from the first combination is equal to HARQ feedback calculated from the second combination.

Certain aspects are directed to a non-transitory computer-readable storage medium having instructions stored thereon for performing operations by a base station (BS). The operations include indicating, to a user equipment (UE), a codebook for uplink transmission of hybrid automatic repeat request (HARQ) feedback, the codebook based on: (i) a number (M) of candidate downlink transmission occasions for a time period, and (ii) a maximum number (k) of downlink transmissions the UE can receive during the time period. The operations include selecting an action to perform based on a set of codepoints of the codebook, the set of codepoints comprising: (i) a first combination of codepoints, and (ii) a second combination of codepoints different from the first combination, wherein HARQ feedback calculated from the first combination is equal to HARQ feedback calculated from the second combination.

Certain aspects are directed to a method for wireless communication by a user equipment (UE). The method includes receiving, from a base station (BS), an indication of a codebook for uplink transmission of hybrid automatic repeat request (HARQ) feedback, the codebook based on: (i) a number (M) of candidate downlink transmission occasions for a time period, and (ii) a maximum number (k) of downlink transmissions the UE can receive during the time period, the codebook comprising: (i) a first plurality of codepoints, (ii) a second plurality of codepoints, (iii) a third plurality of codepoints, and (iv) another one or more codepoints. The method includes receiving a downlink transmission over the time period. The method includes transmitting HARQ feedback for the downlink transmission, the HARQ feedback calculated using one of: the first plurality of codepoints, the second plurality of codepoints, or the third plurality of codepoints if a codepoint location is ambiguous or if the downlink transmission is received in error; or the other one or more codepoints if a codepoint location is not ambiguous and if the downlink transmission is not received in error.

Certain aspects are directed to a user equipment (UE). The UE includes a memory and a processor coupled to the memory. The processor and the memory are configured to receive, from a base station (BS), an indication of a codebook for uplink transmission of hybrid automatic repeat request (HARQ) feedback, the codebook based on: (i) a number (M) of candidate downlink transmission occasions for a time period, and (ii) a maximum number (k) of downlink transmissions the UE can receive during the time period, the codebook comprising: (i) a first plurality of codepoints, (ii) a second plurality of codepoints, (iii) a third plurality of codepoints, and (iv) another one or more codepoints. The processor and the memory are configured to receive a downlink transmission over the time period. The processor and the memory are configured to transmit HARQ feedback for the downlink transmission, the HARQ feedback calculated using one of: the first plurality of codepoints, the second plurality of codepoints, or the third plurality of codepoints if a codepoint location is ambiguous or if the downlink transmission is received in error; or the other one or more codepoints if a codepoint location is not ambiguous and if the downlink transmission is not received in error.

Certain aspects are directed to an apparatus for wireless communication. The apparatus includes means for receiving, from a base station (BS), an indication of a codebook for uplink transmission of hybrid automatic repeat request (HARQ) feedback, the codebook based on: (i) a number (M) of candidate downlink transmission occasions for a time period, and (ii) a maximum number (k) of downlink transmissions the UE can receive during the time period, the codebook comprising: (i) a first plurality of codepoints, (ii) a second plurality of codepoints, (iii) a third plurality of codepoints, and (iv) another one or more codepoints. The apparatus includes means for receiving a downlink transmission over the time period. The apparatus includes means for transmitting HARQ feedback for the downlink transmission, the HARQ feedback calculated using one of: the first plurality of codepoints, the second plurality of codepoints, or the third plurality of codepoints if a codepoint location is ambiguous or if the downlink transmission is received in error; or the other one or more codepoints if a codepoint location is not ambiguous and if the downlink transmission is not received in error.

Certain aspects are directed to a non-transitory computer-readable storage medium having instructions stored thereon for performing operations for wireless communication by a UE. The operations include receiving, from a base station (BS), an indication of a codebook for uplink transmission of hybrid automatic repeat request (HARQ) feedback, the codebook based on: (i) a number (M) of candidate downlink transmission occasions for a time period, and (ii) a maximum number (k) of downlink transmissions the UE can receive during the time period, the codebook comprising: (i) a first plurality of codepoints, (ii) a second plurality of codepoints, (iii) a third plurality of codepoints, and (iv) another one or more codepoints. The operations include receiving a downlink transmission over the time period. The operations include transmitting HARQ feedback for the downlink transmission, the HARQ feedback calculated using one of: the first plurality of codepoints, the second plurality of codepoints, or the third plurality of codepoints if a codepoint location is ambiguous or if the downlink transmission is received in error; or the other one or more codepoints if a codepoint location is not ambiguous and if the downlink transmission is not received in error.

Aspects of the present disclosure provide means for, apparatus, processors, and computer-readable mediums for performing techniques and methods that may be complementary to the operations by each of the UE and by the BS described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
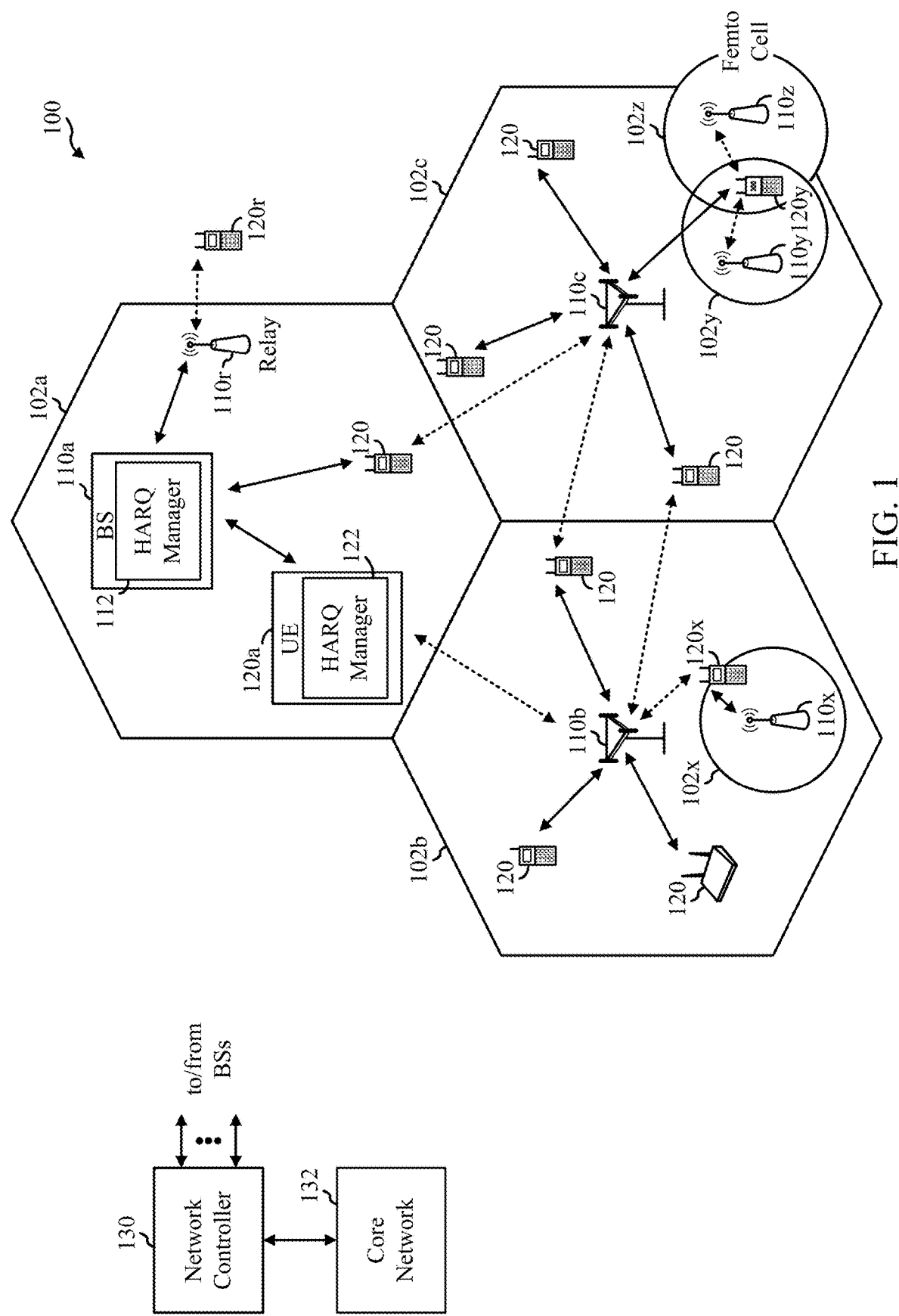
FIG. 1 is a block diagram conceptually illustrating an example telecommunications system, in accordance with certain aspects of the present disclosure.

Aspects of the present disclosure provide apparatus, methods, processing systems, and computer readable mediums for techniques for reducing ambiguity of HARQ feedback.

In certain aspects, a UE is configured to provide feedback to a transmitting device (e.g., a base station (BS)), indicating whether the UE has successfully received and decoded a transmission sent from the transmitting device. In certain aspects, the feedback is one or more of an acknowledgement (ACK) indicating the UE has successfully received and decoded the transmission and/or a negative ACK (NACK) indicating the UE has not successfully received and decoded the transmission. In certain aspects, reference to ACK feedback, HARQ-ACK feedback, or HARQ feedback herein may generally refer to feedback using ACK and/or NACK indications.

In certain aspects, a UE transmits an ACK when it has successfully received and decoded the transmission and refrains from transmitting an ACK when it has not successfully received and decoded the transmission. In certain aspects, a UE transmits a NACK when it has not successfully received and decoded the transmission and refrains from transmitting a NACK when it has successfully received and decoded the transmission. In certain aspects (e.g., for a HARQ process with feedback enabled as discussed herein), a UE transmits an ACK when it has successfully received and decoded the transmission and transmits a NACK when it has not successfully received and decoded the transmission.

In certain aspects, a UE is configured with one or more HARQ processes. Accordingly, in certain aspects, the UE maintains one or more buffers, each buffer corresponding to one of the one or more HARQ processes. Each HARQ process may be used for buffering data for a given downlink channel (e.g., control channel such as a physical downlink control channel (PDCCH) or a data channel such as a physical downlink shared channel (PDSCH)) at a time (e.g., per subframe, slot, etc.). In particular, as part of a HARQ process, the UE buffers data that is received even if it cannot successfully decode the data, and informs the BS that it could not decode the data for that channel for that time period. The BS may then resend the data to the UE, and the UE may then use both the previously received data and the resent data in combination (e.g., soft combining) to attempt to decode the data. Accordingly, different HARQ processes of the UE may be assigned to different downlink channels/downlink occasions at a time, and used to try and successfully receive and decode data. Each HARQ process may be identified by an identifier referred to as a HARQ ID, so that the receiver and transmitter are aware of which data belongs to which HARQ process.

In aspects, ACK/NACK feedback reported by a UE may be formatted according to a codebook. For example, a codebook with respect to HARQ may define the number of HARQ bits to be reported and the order in which certain HARQ bits are arranged. The codebook may also define what each HARQ bit represents based on the location of the HARQ bit in the HARQ feedback. For example, a given HARQ bit may correspond to a specific code block group (CBG), a specific transport block (TB), a specific HARQ process, a specific carrier, and/or a specific serving cell. The codebook provides a mapping of the HARQ bit locations in the HARQ feedback to specific HARQ transmissions based on the respective CBG, TB, HARQ process, carrier, and/or serving cell. As used herein, a carrier may refer to a component carrier.

In some cases, a UE may transmit aggregated HARQ feedback in response to a plurality of downlink communications. For example, the UE may be configured to receive up to k downlink communications during a period of time. In some examples, the period of time is also known as a constrained set of resources. The constrained set of resources may include M possible downlink occasions of which a downlink communication may be transmitted. Here, although k and M may be any suitable whole number, examples of possible values are provided throughout this disclosure. After receiving k or less downlink communications during a single constrained set of resources, the UE may map a binary vector corresponding to each of one or downlink transmission occasions over which downlink data is received to a codepoint value in the codebook. The UE may then calculate an aggregated HARQ feedback based on each of the codepoint values for that constrained set. In this way, a single HARQ feedback can indicate an ACK/NACK for each of the k or fewer downlink communications received by the UE in a constrained set.

In some cases, the UE may calculate an aggregated HARQ feedback based on fewer than k downlink transmissions (e.g., k−2 downlink transmissions received by the UE) during a constrained set despite the BS having transmitted additional downlink communications that the UE did not receive. In such cases, the aggregated HARQ feedback may provide an ambiguous indication of which transmissions were received by the UE and which were not. For example, the aggregated HARQ feedback may correspond to two or more different possibilities of received or not received downlink transmissions. Thus, the UE may use an enhanced codebook comprising one or more additional pools of codepoints that corresponds to scenarios that may result in an ambiguous HARQ feedback. Alternatively, the UE may calculate an aggregated HARQ feedback that includes additional information (e.g., a q value described in more detail below) configured to rule out ambiguous possibilities of which downlink communications were received or not received by the UE.

The following description is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for reducing ambiguous HARQ feedback based on a maximum number of downlink transmissions (k) the UE 120 is configured to receive during a particular time period, and a number of downlink occasions (M) provided during that time period. As shown in FIG. 1, the BS 110a includes a HARQ manager 112. The HARQ manager 112 may be configured to indicate, to the UE 120a, a codebook for uplink transmission of HARQ feedback, the codebook based on: (i) a number (M) of candidate downlink transmission occasions for a time period, and (ii) a maximum number (k) of downlink transmissions the UE 120a can receive during the time period. The HARQ manager 112 may also be configured to select an action to perform based on a set of codepoints of the codebook, the set of codepoints comprising: (i) a first combination of codepoints, and (ii) a second combination of codepoints different from the first combination, wherein HARQ feedback calculated from the first combination is equal to HARQ feedback calculated from the second combination.

As shown in FIG. 1, the UE 120a includes a HARQ manager 122. The HARQ manager 122 may be configured to receive, from a BS 110a, an indication of a codebook for uplink transmission of HARQ feedback, the codebook based on: (i) a number (M) of candidate downlink transmission occasions for a time period, and (ii) a maximum number (k) of downlink transmissions the UE can receive during the time period, the codebook comprising: (i) a first plurality of codepoints, (ii) a second plurality of codepoints, (iii) a third plurality of codepoints, and (iv) another one or more codepoints. The HARQ manager 122 may also be configured to receive a downlink transmission over the time period. The HARQ manager 122 may also be configured to transmit HARQ feedback for the downlink transmission, the HARQ feedback calculated using one of: (i) the first plurality of codepoints, the second plurality of codepoints, or the third plurality of codepoints if a codepoint location is ambiguous or if the downlink transmission is received in error, or (ii) the other one or more codepoints if a codepoint location is not ambiguous and if the downlink transmission is not received in error.

Figure 2:
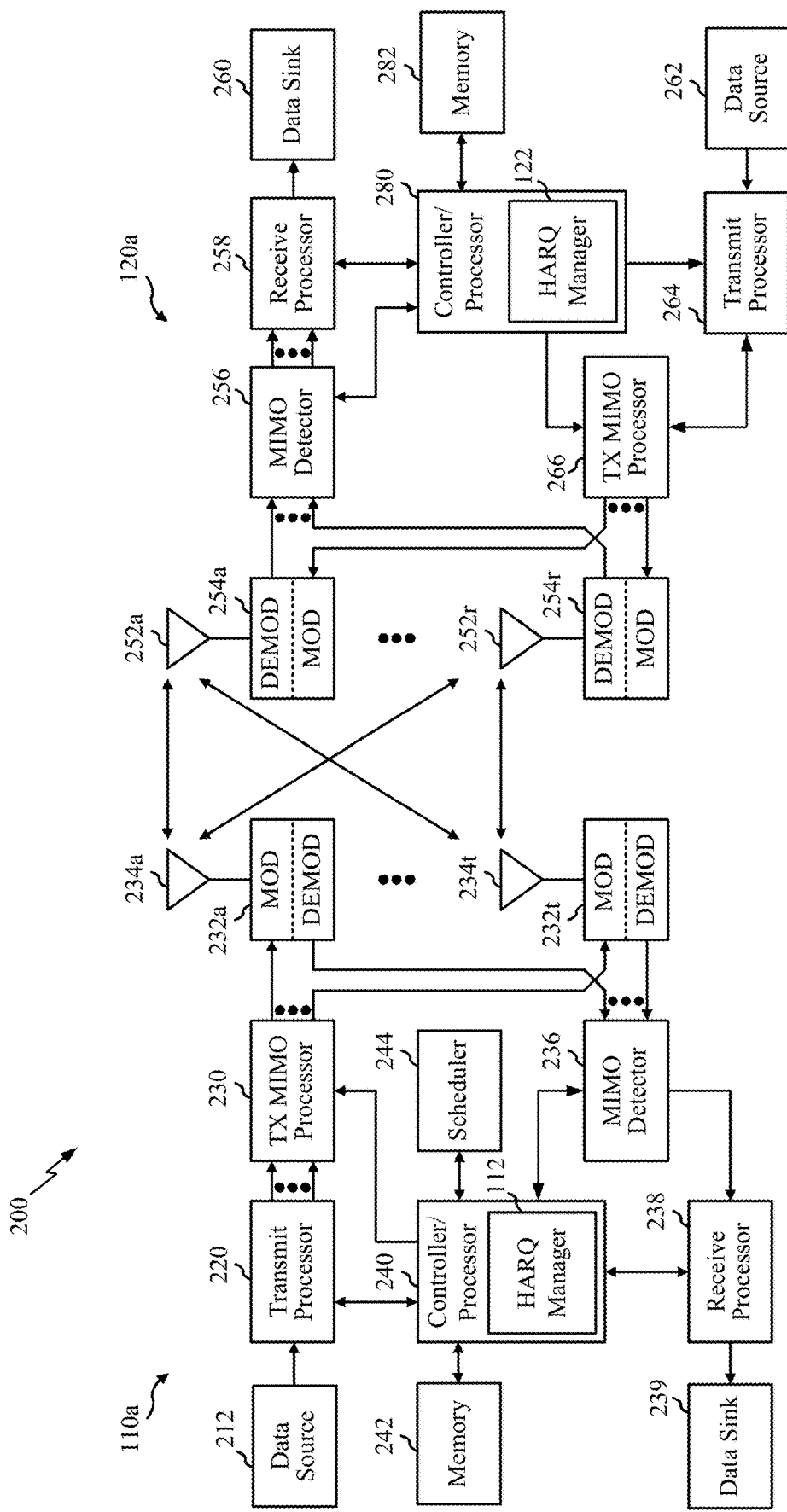
FIG. 2 is a block diagram conceptually illustrating a design of an example of a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254*a*-254*r* (e.g., for SC-FDM, etc.), and transmitted to the BS 110*a*. At the BS 110*a*, the uplink signals from the UE 120*a* may be received by the antennas 234, processed by the modulators in transceivers 232*a*-232*t*, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. For example, as shown in FIG. 2, the controller/processor 240 of the BS 110*a* includes the HARQ manager 112 that may be configured for indicating, to a user equipment (UE), a codebook for uplink transmission of hybrid automatic repeat request (HARQ) feedback, the codebook based on: (i) a number (M) of candidate downlink transmission occasions for a time period, and (ii) a maximum number (k) of downlink transmissions the UE can receive during the time period. The HARQ manager 112 may be configured for selecting an action to perform based on a set of codepoints of the codebook, the set of codepoints comprising: (i) a first combination of codepoints, and (ii) a second combination of codepoints different from the first combination, wherein HARQ feedback calculated from the first combination is equal to HARQ feedback calculated from the second combination.

As shown in FIG. 2, the controller/processor 280 of the UE 120*a* includes the HARQ manager 122 that may be configured for receiving, from a base station (BS), an indication of a codebook for uplink transmission of hybrid automatic repeat request (HARQ) feedback, the codebook based on: (i) a number (M) of candidate downlink transmission occasions for a time period, and (ii) a maximum number (k) of downlink transmissions the UE can receive during the time period, the codebook comprising: (i) a first plurality of codepoints, (ii) a second plurality of codepoints, (iii) a third plurality of codepoints, and (iv) another one or more codepoints. The HARQ manager 122 may be configured for receiving a downlink transmission over the time period. The HARQ manager 122 may also be configured for transmitting HARQ feedback for the downlink transmission, the HARQ feedback calculated using one of: (i) the first plurality of codepoints, the second plurality of codepoints, or the third plurality of codepoints if a codepoint location is ambiguous or if the downlink transmission is received in error, or (ii) the other one or more codepoints if a codepoint location is not ambiguous and if the downlink transmission is not received in error.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
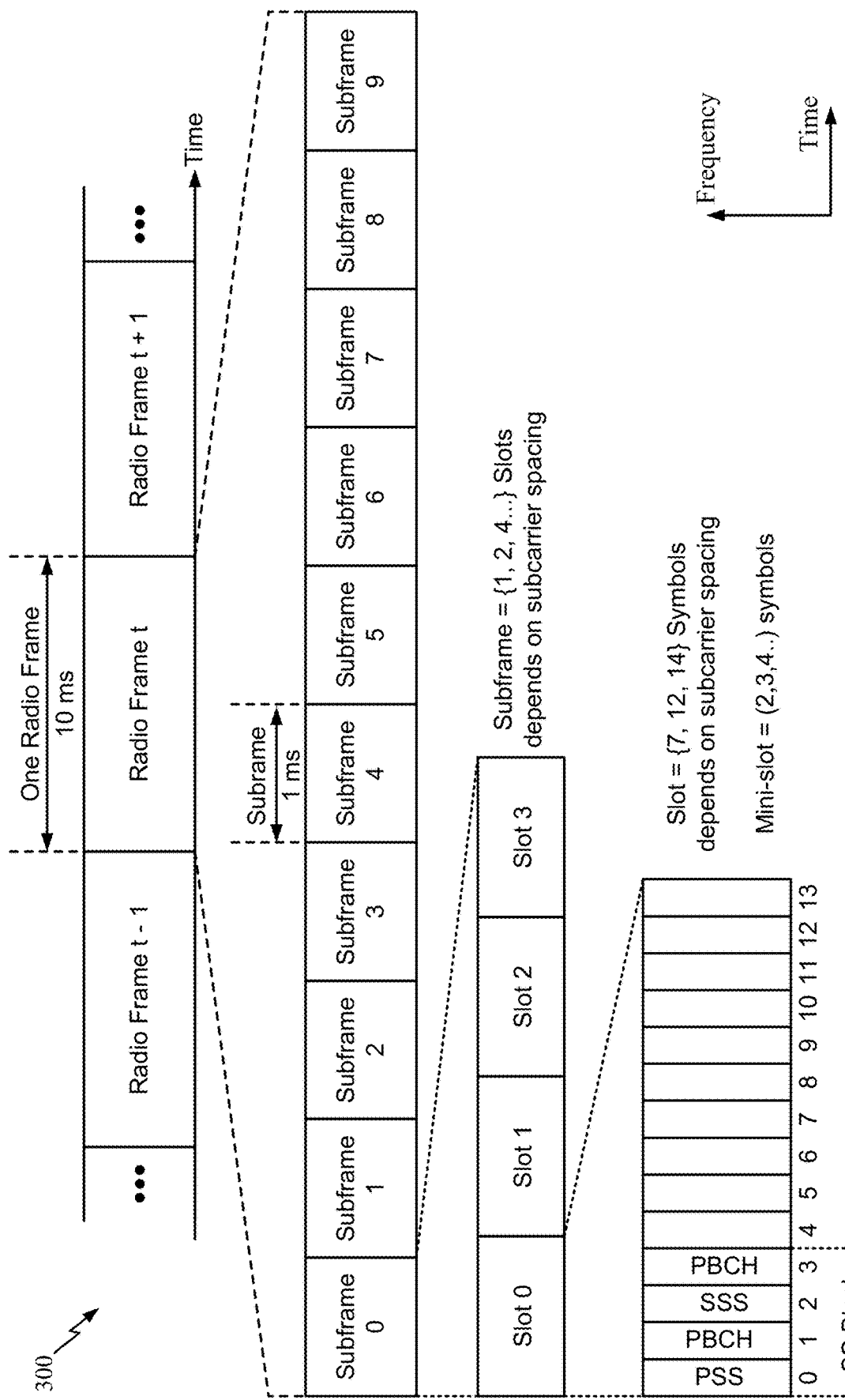
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., downlink (DL), uplink (UL), or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some cases, a base station may communicate downlink transmissions to a UE using a downlink channel in a slot and/or mini slot. In response, the UE may transmit feedback transmissions to the base station in response to receipt or not receiving the downlink transmission. For example, base station may send downlink transmissions on a physical downlink shared channel (PDSCH) using the slot or a portion of the slot. The UE may receive the downlink data transmitted by base station and may send feedback transmissions. In some cases, downlink transmissions may include one or more downlink messages and feedback transmissions may include HARQ feedback (e.g., formatted according to a semistatic HARQ-ACK codebook).

According to some aspects, the UE may use HARQ feedback to ensure reception of the transmitted data. For example, the UE may send HARQ feedback transmissions that include an acknowledgement (ACK) or a negative acknowledgement (NACK) for data received by the UE. In such cases, the UE may monitor for downlink messages sent by a base station during one or more downlink transmission occasions. In some examples, each downlink transmission occasion is characterized by a time period (e.g., a subframe, slot, mini slot, etc.) during which the UE monitors a set of resources (e.g., resource elements (REs), resource blocks (RBs), etc.) to identify data sent to the UE from the base station.

As described below, a UE (e.g., UE 120 of FIG. 1) may be configured to communicate HARQ feedback to a base station based on a number (M) of candidate downlink transmission occasions (e.g., downlink resources for transmission of downlink data), for a time period (e.g., a constrained set of resources), and a maximum number (k) of simultaneous downlink transmissions the UE can receive during the time period. Thus, when the UE successfully receives one or more downlink transmissions during the time period from the base station, the UE may determine a type of encoding for the HARQ feedback based on: (i) a number of the one or more downlink transmissions received, (ii) the number (M) of candidate downlink transmission occasions for the corresponding time period, and (iii) the maximum number (k) of simultaneous downlink transmissions. The UE may then encode the HARQ feedback using the determined type of encoding, and transmit the HARQ feedback to the base station.

Figure 4:
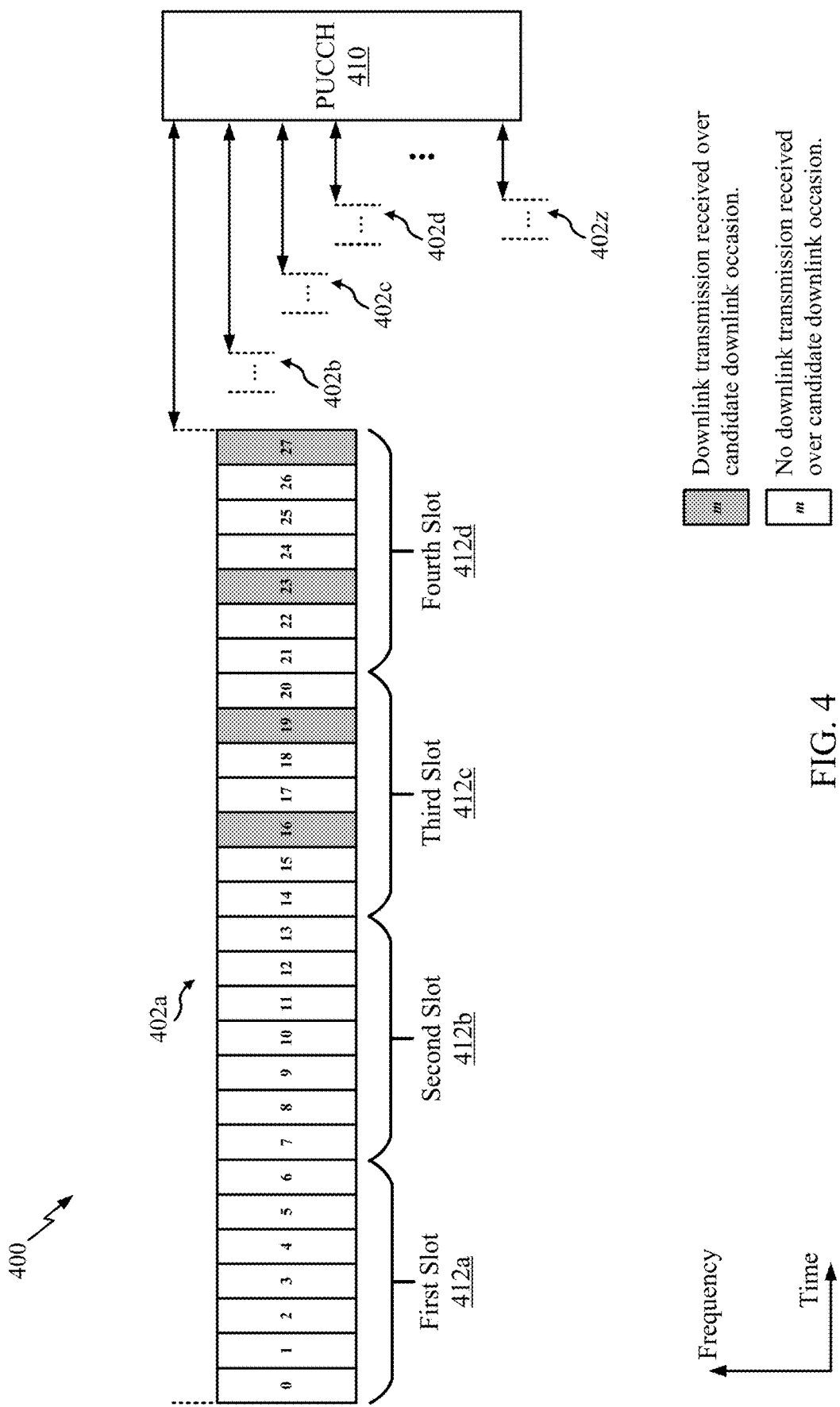
FIG. 4 is a block diagram illustrating an example of an aggregated hybrid automatic repeat request (HARQ) feedback transmitted via a PUCCH, in accordance with certain aspects of the present disclosure.

FIG. 4 is a block diagram illustrating an example of an aggregated HARQ ACK feedback transmitted via a PUCCH 410. The UE (e.g., UE 120a of FIG. 1) may aggregate feedback for downlink transmissions received in one or a plurality of constrained sets (e.g., constrained sets 402a through 402z—collectively referred to as "constrained sets 402") into a single HARQ ACK message transmitted to a BS (e.g., BS 110a of FIG. 1). Thus, the UE 120a may be configured to receive a plurality of downlink data transmissions in each of one or more constrained sets 402 prior to generating a HARQ feedback based on an aggregate of the downlink data transmissions received by the UE, and transmitting the HARQ feedback to the BS 110a. For example, the UE 120a may be configured generate and transmit aggregated HARQ feedback for every four contiguous constrained sets, or any other suitable number of constrained sets. In some examples, the number of constrained sets that the UE 120a aggregates HARQ feedback for may be configured by the BS 110a or according to a particular RAT. The plurality of constrained sets 402 may form a temporally contiguous series of constrained sets. In this example, each of the plurality of constrained sets 402 includes four slots, wherein each of the four slots includes seven downlink occasions. For example, a first constrained set 402a includes four slots (e.g., slot 412a through 412d—collectively referred to as "slots 412"), wherein each of the four slots 412 include seven downlink occasions for a total of M=28 candidate downlink transmission occasions numbered 0 through 27.

The UE 120a may be configured to receive any suitable number of downlink transmissions during each of the constrained sets 402. In certain aspects, the UE 120a may be configured to receive up to k downlink transmissions during each of the constrained sets 402. In some examples, k may be set by a manufacturer according to hardware and/or software capabilities of a particular UE, and may indicate a maximum number of downlink transmissions the UE 120a can receive during a given constrained set. Alternatively, k of a UE 120a may be configured by a BS 110a or according to a particular RAT. For purposes of this example, k of the UE 120a may be set to 4. That is, the UE 120a may be configured to receive up to 4 downlink transmissions during each of the plurality of constrained sets 402. Stated differently, for the UE 120a with k=4 and M=28, the UE 120a may receive up to four downlink transmissions within the 28 candidate downlink transmission occasions of each of the plurality of constrained sets 402. As illustrated in the example of FIG. 4, the UE 120a may receive a downlink transmission in candidate occasions 16, 19, 23, and 27 of the first constrained set 402a. Although FIG. 4 illustrates each received downlink transmission as including one candidate occasion, each of the downlink transmissions may span one or more contiguous candidate occasions.

In certain aspects, the BS 110a may configure the UE 120a with the codebook prior to transmitting downlink data to the UE 120a. In some examples, the BS 110a may transmit an indication of a codebook for uplink transmission of HARQ ACK feedback to the UE 120a. The codebook may be based on: (i) the number (M) of candidate downlink transmission occasions for each of the plurality of constrained sets 402, and (ii) the number (k) of downlink transmissions the UE 120a can receive within a constrained set.

For each of the plurality of constrained sets 402, the UE 120a may determine a codebook entry that corresponds to the received downlink transmissions. In one example, the UE 120a may first determine an M-bit binary vector that corresponds individually to each received downlink data transmission of a constrained set, or alternatively, an M-bit binary vector that corresponds to all of the received downlink data transmissions as a group. In either case, the M-bit binary vector identifies the candidate occasions over which a downlink transmission was received. Thus, for the first constrained set 402a, the UE 120a may determine four 28-bit binary vectors individually for each of the four downlink data transmissions received by the UE 120a: 0x0000000000001, 0x0000000010000, 0x0000100000000, and 0x0100000000000. Alternatively, the UE 120a may determine a 28-bit binary vector for the four downlink data transmissions received by the UE 120a as a group: 0x0100100010001, or alternatively, 1x1011011101110. The UE 120a may then map the determined binary vector(s) to a corresponding codebook entry.

In certain aspects, for each determined binary vector, the UE 120a may also determine a codebook index or "codepoint" of a codebook entry that corresponds to the vector. The codepoint may be any integer or whole number that uniquely (relative to other codepoints in the codebook) identifies the codebook entry that corresponds to a particular binary vector. For example, the codebook may include an entry having a same 28-bit binary vector as the one determined by the UE 120a for the first constrained set 402a. Once the UE 120a determines that the vector matches the codebook entry, the UE 120a may determine a codepoint of that codebook entry. Accordingly, for each of one or more constrained sets 402, the UE 120a may determine a codepoint from the codebook based on the determined binary vector of each constrained set.

Once the UE 120a has determined a codepoint for each of either (i) the received downlink data transmissions of a single constrained set, or (ii) the plurality of constrained sets 402, the UE 120a may calculate a sum of the codepoints (x) then determine a number of bits (L) corresponding to an aggregated HARQ feedback for uplink transmission over the PUCCH 410 according to equation 1 below.

$$L = x \bmod (M+1) \qquad \text{Equation 1}$$

For example, if the UE 120a is configured to transmit an aggregated feedback of four constrained sets, the UE 120a will calculate a sum (x) of the four codepoints corresponding to the four constrained sets, then calculate the value of L using x mod (29). Alternatively, if the UE 120a is configured to transmit an aggregated feedback of downlink data transmissions received in a single constrained set 402a, the UE 120a will calculate a sum (x) of codepoints corresponding to each of the received downlink data transmissions, then calculate the value of L using x mod (29). The UE 120a may then transmit L to the BS 110a.

Figure 5:
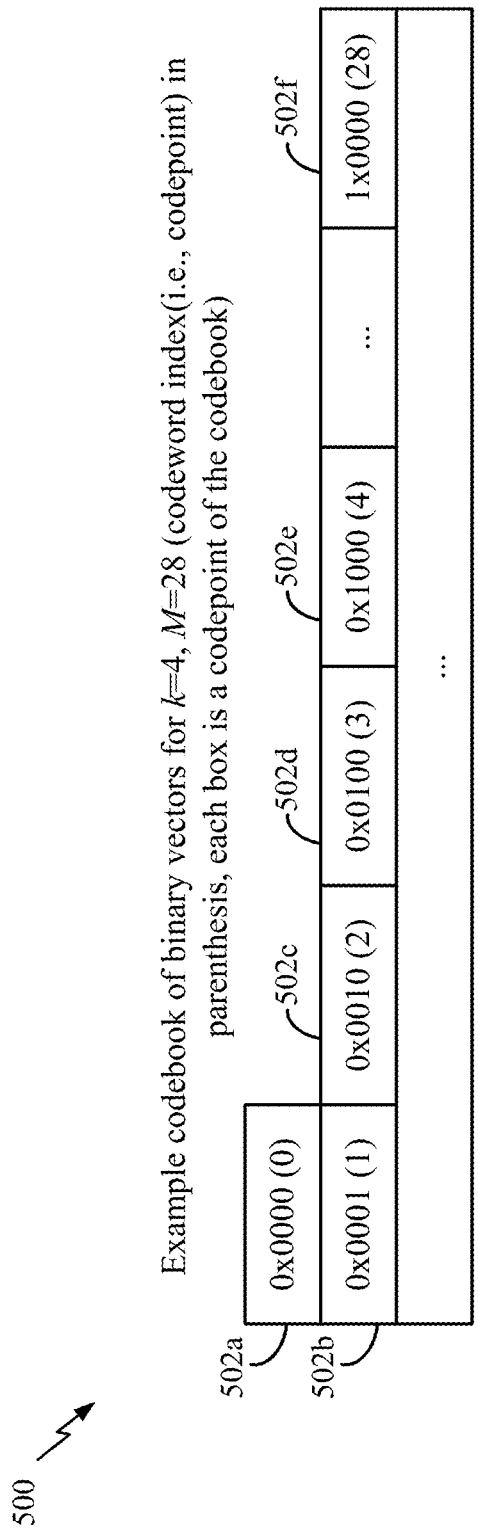
FIG. 5 is a block diagram illustrating an example codebook generated by a BS for a UE, in accordance with certain aspects of the present disclosure.

FIG. 5 is a block diagram illustrating an example codebook 500 generated by the BS 110a for the UE 120a. The codebook includes a plurality of entries (e.g., entries 502a-502f), each of which corresponds to a particular binary vector and a codepoint. As discussed, the codebook may be generated by the BS 110a based on the M and k values for a particular UE 120a. For example, where M=28 and k=4, the codebook may include 1 codepoint for 0 ACKs (e.g., binary vector 0x000), 28 codepoints for 1 ACK, 32 codepoints for 2 ACKs, 32 codepoints for 3 ACKS, and 1 codepoint for 4 ACKs. As such, the codebook may only include entries that correspond to binary vectors having k or less bits indicating successful reception of downlink transmissions. That is, the codebook may not include a binary vector having five or more bits indicating a successful transmission because the BS 110a will send no more than four downlink transmissions for each constrained set.

Example Method for Providing Harq Feedback for
k-1 and k-2 Downlink Receptions

As discussed, the UE 120a determines one codepoint for each of the plurality of constrained sets 402, then computes an aggregated HARQ feedback based on a plurality of codepoints. However, there may be situations where the UE 120a does not receive all k of the downlink transmissions provided by the BS 110a in a single constrained set. Thus, the L value transmitted by the UE 120a may not account for all of the downlink transmissions, and furthermore, the L value may be ambiguous in that it does not indicate to the BS 110a which of the downlink transmissions the UE 120a did not receive (e.g., the L value may indicate at least two possibilities of which downlink transmissions were received by the UE 120a).

In one example, a UE 120a may be configured to determine and transmit an aggregated HARQ feedback (e.g., a calculated $L_{UE}$ value) to the BS 110a after a constrained set (e.g., constrained set 402a of FIG. 4, wherein M=28 transmission occasions across four slots 412a-412d). In this example, the BS 110a transmits k=4 downlink communications to the UE 120a in the constrained set, wherein the four transmissions correspond to codepoints {1, 4, 5, and 8} within the codebook. Thus, the sum (x) of the four codepoints associated with downlink transmissions made by the BS 110a over the constrained set 402a equals 18 (e.g., x=18). Assuming, however, that the UE 120a does not receive the second downlink transmission corresponding to codepoint 4, then the sum of the codepoints corresponding to downlink transmissions received by the UE 120a equals 14 (e.g., x=14). Accordingly, using equation 1, the UE 120a calculates the aggregated HARQ feedback using ($L_{UE}$=14 mod 29) and determines $L_{UE}$=14. The UE 120a then transmits 14 to the BS 110a as the aggregated HARQ feedback for the constrained set.

In this example, the BS 110a may use the expected L value (e.g., $L_e$=18) to determine which of the downlink transmission(s) of the constrained set 402a were not received by the UE 120a. The BS 110a may calculate the missing codepoint (e.g., $c_m$—the codepoint corresponding to the downlink transmission not received by the UE 120a) using equation 2:

$$c_m = L_e - L_{UE} \qquad \text{Equation 2}$$

Here, the BS 110a calculates the codepoint not received by the UE 120a as $c_m$=4. The BS 110a may then determine which of the four transmissions of the constrained set 402a would have a codepoint that is equal to 4 in order to determine which of the downlink transmissions the UE 120a did not receive.

However, in a case where the UE 120a receives k–2 downlink transmissions during a constrained set, there may be additional ambiguity that prevents the BS 110a from being able to determine which downlink transmission the UE 120a did not receive.

Using the same example as above, the BS 110a transmits k=4 downlink communications to the UE 120a in the constrained set 402a, wherein the four transmissions correspond to codepoints {1, 4, 5, and 8} within the codebook. However, in this example, the UE 120a does not receive downlink transmissions corresponding to codepoints 4 or 5. Here, the sum of the codepoints corresponding downlink transmissions received by the UE 120a equals 9 (e.g., x=1+8=9). Accordingly, using equation 1, the UE 120a calculates the aggregated HARQ feedback using (9 mod 29) and determines $L_{UE}$=9. The UE 120a then transmits 9 to the BS 110a as the aggregated HARQ feedback for the constrained set 402a.

The BS 110a may then use the expected L value (e.g., $L_e$=18) to determine which of the k downlink transmissions were not received by the UE 120a. However, in this example, if the BS 110a uses equation 2 to calculate the missing codepoint (e.g., $c_m$), the calculation will result in a value of 9. However, because the BS 110a would expect that the UE 120a received downlink transmissions corresponding to codepoints 1, 4, 5, and 8, the calculated $c_m$ does not correspond to a valid codepoint reflective of the k downlink transmissions by the BS 110a.

Because the calculation of $c_m$ does not result in a valid codepoint, the BS 110a may attempt to determine if downlink transmissions associated with two of the k downlink transmissions failed to reach the UE 120a. However, this may result in ambiguity as to which two of downlink transmissions were not received by the UE 120a. For example, the UE 120a provided "9" as the HARQ feedback, yet a sum of the codepoints corresponding to corresponding to codepoints 4 and 5 equals 9, and a sum of the corresponding to codepoints 1 and 8 equals 9. Accordingly, the BS 110a may not be able to determine with certainty which two codepoints correspond to the downlink transmissions that the UE 120a did not receive.

Example Method for Resolving Ambiguity for k–2 Downlink Receptions

Figure 6:
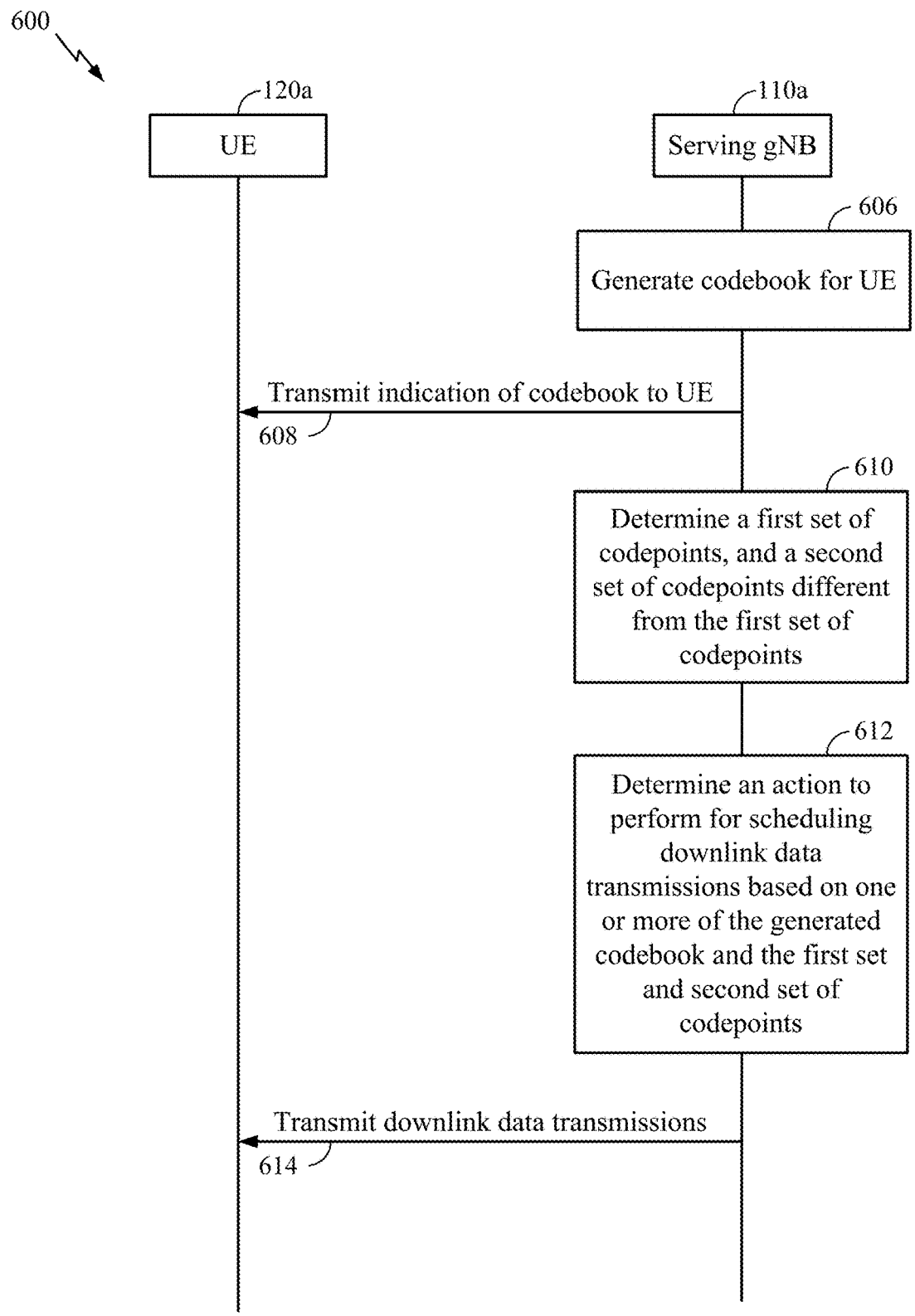
FIG. 6 is a call flow diagram illustrating a process for a BS to communicate with a UE, in accordance with certain aspects of the present disclosure.

In certain aspects, the BS 110a may take one or more actions in order to avoid the foregoing ambiguity. For example, FIG. 6 is a call flow diagram illustrating communications 600 between a BS 110a and a UE 120a in a manner that takes into account the possibility of receiving an ambiguous HARQ feedback in response to downlink communications made in a constrained set of resources. In a first process 606, the BS 110a may generate a codebook (e.g., the codebook 500 of FIG. 5) for the UE 120a based on M and k values of the UE 120a. Then, in a first communication 608, the BS 110a may transmit an indication of the codebook to the UE 120a. In some examples, the BS 110a may transmit the entire codebook to the UE 120a, or alternatively, the UE 120a may already include one or more codebooks stored in a memory, of which the BS 110a can select from and enable via the first communication 608.

In a second process 610, the BS 110a may determine a set of codepoints comprising: (i) a first combination of codepoints, and (ii) a second combination of codepoints different from the first combination. Here, the BS 110a determines the set based on whether HARQ feedback calculated from the first combination is equal to HARQ feedback calculated from the second combination. Accordingly, the BS 110a has a set of codepoints that can cause ambiguity in a HARQ feedback from the UE 120a.

In a third process 612, the BS 110a may determine and select one or more of a plurality of actions to perform when scheduling and transmitting downlink data to the UE 120a. The plurality of actions may include scheduling, by the BS 110a, a plurality of downlink data transmissions to the UE 120a downlink resources (e.g., downlink transmission occasions) that do not correspond to the first combination of codepoints and the second combination of codepoints. For example, in a k=4 scenario, the BS 110a may schedule three downlink transmissions to the UE, then for a fourth downlink transmission the BS 110a may determine to transmit over downlink resources that do not correspond to a codepoint that would result in ambiguity with any of the initial three downlink transmissions of a constrained set.

In some examples, the plurality of actions may include the BS 110a determining to refrain from transmitting the fourth downlink transmission if there is no alternative downlink resource that will resolve a potential ambiguity (e.g., the fourth downlink transmission can only be sent over downlink resources that correspond to a codepoint in one of the first or second combinations, wherein one of the other three downlink transmissions correspond to the other of the first or second combination).

In some examples, the plurality of actions may include determining, by the BS 110a, a downlink transmission occasion in a constrained set (e.g., constrained set 402a of FIG. 4) for transmitting downlink data to the UE 120a. The BS 110a may then determine a likelihood that HARQ feedback calculated from the downlink data transmissions will result in an ambiguity. For example, the BS 110a may determine a likelihood that the UE 120a would not receive one or more downlink transmissions that would result in ambiguous HARQ feedback based on movement of the UE 120a, quality of previous communications between the BS 110a and the UE 120a (e.g., determining that reference signal received power (RSRP), reference signal received quality (RSRQ), and the like are measured to be above a threshold). In this example, the BS 110a may determine whether to transmit or schedule one or more downlink transmissions if it is likely that the UE 120a may not receive a transmission. That is, if it is likely that the UE 120a will not receive a transmission, and a HARQ feedback calculated by the UE 120a would result in an ambiguous value if calculated without having received that transmission, then the BS 110a may determine an action to take.

In some examples, the plurality of actions may include ignoring, by the BS 110a, any HARQ feedback from the UE 120a that may be ambiguous. In a second communication 614, the BS 110a may transmit downlink data to the UE 120a.

Example Method for Resolving Ambiguity for k–2 Downlink Receptions Via Enhanced Codebook In certain aspects, the BS 110a may generate an enhanced codebook comprising subsets of codepoints (e.g., one or more pools of codepoints, wherein each pool represents less than all of the codepoints in a codebook) or "pools" of codepoints configured to resolve any ambiguity of a HARQ feedback. For example, where M=28 and k=4, the enhanced codebook may include the following enumerated codepoints: (i) 1 codepoint for 0 ACK; (ii) 28 codepoints for 1 ACK; (iii) 32 codepoints for 2 ACKs (e.g., a first pool of codepoints corresponding to a scenario wherein the UE 120*a* receives two downlink control channel transmissions in a single constrained set, or four downlink control channel transmissions in the single constrained set with no ambiguous ACK location); (iv) 32 codepoints for 2 ACKs (e.g., a second pool of codepoints corresponding to a scenario wherein the UE 120*a* receives three downlink control channel transmissions in a single constrained set and q=0, or four downlink control channel transmissions in the single constrained set with an ambiguous ACK location and q=0); (v) 32 codepoints for 2 ACKs (e.g., a third pool of codepoints corresponding to a scenario wherein the UE 120*a* receives three downlink control channel transmissions in a single constrained set and q=1, or four downlink control channel transmissions in the single constrained set with an ambiguous ACK location and q=1); (vi) 32 codepoints for 3 ACKs; and (vii) 1 codepoint for 4 ACKs. Accordingly, if the UE 120*a* receives k downlink transmissions in a constrained set that meet one of the foregoing rules, the UE 120*a* may provide HARQ feedback using a corresponding codepoint from one of the pools of codepoints in the enhanced codebook.

Figure 7:
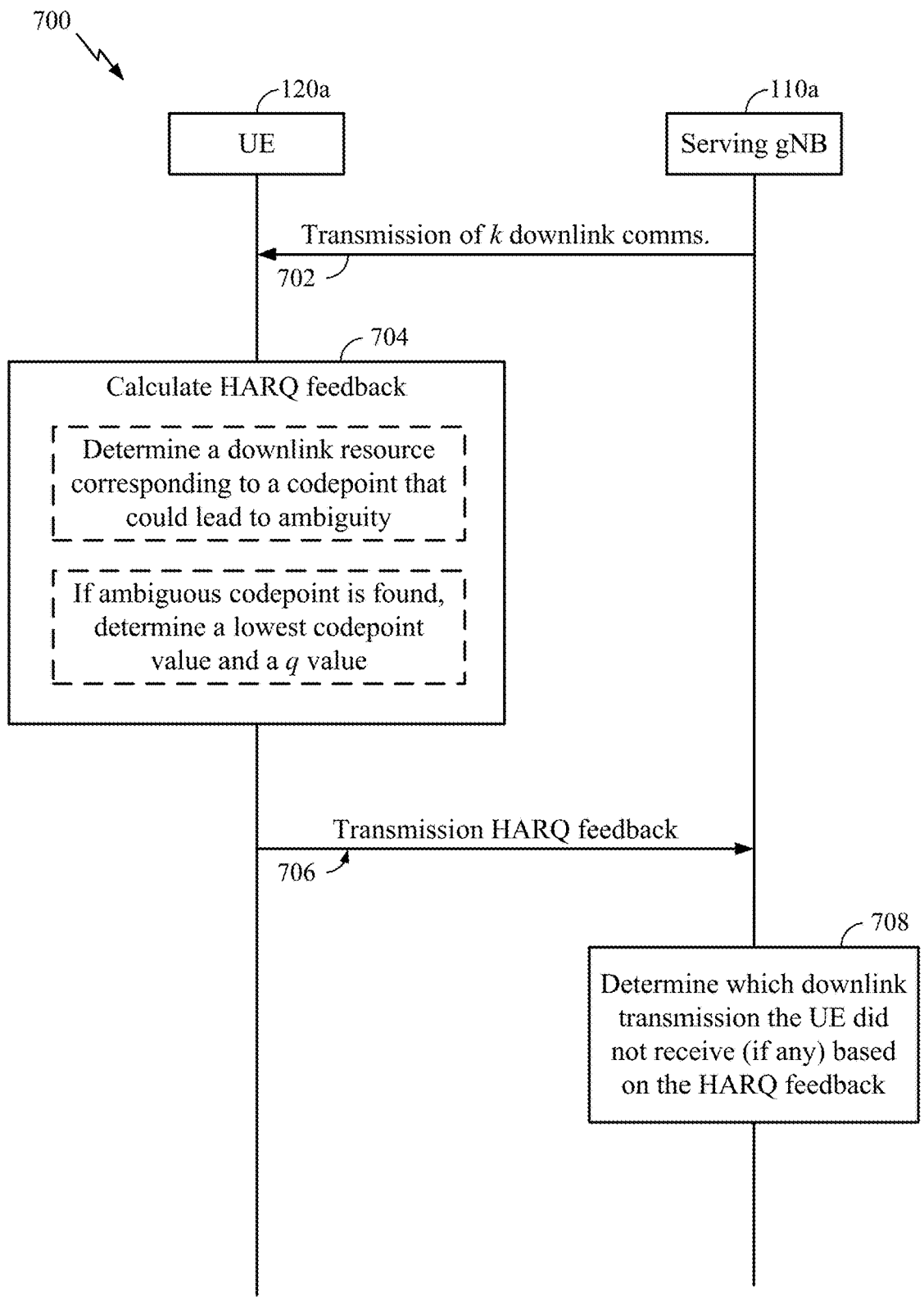
FIG. 7 is a call flow diagram illustrating an example of how a UE and BS use an enhanced HARQ codebook, in accordance with certain aspects of the present disclosure.

FIG. 7 is a call flow diagram illustrating example communications 700 between a UE (e.g., the UE 120*a* of FIG. 1) and a BS (e.g., the BS 110*a* of FIG. 2). As a first example, the BS 110*a* may transmit four downlink communications to the UE during a first constrained set of downlink resources in a first communication 702. The four downlink communications include: (i) a first downlink data transmission corresponding to codepoint 1, (ii) a first downlink control transmission (e.g., transmission over PDCCH) corresponding to codepoint 4, (iii) a second downlink data transmission corresponding to codepoint 5, and (iv) a third downlink data transmission corresponding to codepoint 8.

In this example, the UE 120*a* receives the first downlink data transmission, the first downlink control transmission, and the third downlink data transmission, but does not receive the second downlink data transmission. Thus, in a first process 704, the UE 120*a* may perform a calculation of an aggregated HARQ feedback for the received transmissions. Note that the UE 120*a* may determine not to include the first downlink control transmission in its calculation of the HARQ feedback. Accordingly, the UE 120*a* sums the codepoints corresponding to the received downlink data transmissions, resulting in 9.

The UE 120*a* then determines whether there are any codepoints that correspond to a valid downlink resource that could lead to ambiguity of the HARQ feedback. Here, because the UE 120*a* received transmissions corresponding to codepoints 1, 4, and 8, and decoded PDSCH corresponding to codepoints 1 and 8, the UE 120*a* may determine that codepoint 5 would lead to ambiguity (e.g., the UE would feedback a HARQ ACK for codepoints {1,8} which is equivalent (e.g., leading to ambiguity) to a HARQ ACK for codepoints {4,5}. That is, the UE 120*a* determines that if the BS 110*a* transmitted a downlink communication that was not received in a downlink resource that corresponds to codepoint 5, the HARQ feedback of 9 would result in an ambiguous HARQ feedback. The HARQ feedback would be ambiguous because the BS 110*a* would not be able to determine which of the transmissions were not received by the UE 120*a* (e.g., 1+8=9 and 4+5=9), so a HARQ feedback based on 9 could provide two different indications of what the UE 120*a* received. Thus, the UE 120*a* may determine that codepoint 5 is an ambiguity, and could make a HARQ feedback ambiguous if the BS 110*a* transmitted a downlink communication in a downlink resource corresponding to codepoint 5.

Based on the determination that codepoint 5 is an ambiguity, the UE 120*a* may determine a q value. In some examples, the UE 120*a* determines a q value by determining a lowest codepoint value of the three codepoints corresponding to the received downlink transmissions and the ambiguous codepoint. For example, if the UE 120*a* receives codepoints 4, 5, and 8 corresponding to the received downlink transmissions, and determines the ambiguous codepoint to be 1, then the lowest codepoint value is the ambiguous codepoint. However, if the UE 120*a* receives codepoints 1, 4, and 5 corresponding to the received downlink transmissions, and determines the ambiguous codepoint to be 8, then the lowest codepoint value is the "1" value received in a downlink transmission. The UE 120*a* may then determine a q value based on whether the lowest codepoint value is a codepoint corresponding to a received downlink communication. For example, if the lowest codepoint value corresponds to the ambiguous codepoint, then the UE may set q=1. However, if the lowest codepoint value corresponds to a codepoint associated with a received downlink communication, then the UE 120*a* may set q=0. In this example, because the lowest codepoint value is 1, and because the lowest codepoint value corresponds to a downlink data transmission received by the UE 120*a*, the UE 120*a* will set a q value to "0" (e.g., q=0).

In a second communication 706, the UE 120*a* transmits the determined HARQ feedback. In this example, the HARQ feedback comprises two values, (9,0), where the 9 is the HARQ feedback determined based on the received downlink data transmissions, and the 0 is the determined q value. Although outside the scope of the first example, it should be note that if no ambiguous codepoint is found by the UE 120*a* during the first process 704, the UE 120*a* will transmit, during the second communication 706, HARQ ACK feedback using Equation 1 above and the codepoints corresponding to the received downlink transmissions without a q value.

At a second process 708, the BS 110*a* will determine which (if any) downlink transmission was not received by the UE based on the HARQ feedback. Here, the BS 110*a* may use the q value to determine that the downlink transmission corresponding to the lowest ambiguous codepoint value (e.g., 1) was received by the UE 120*a*, and thus, the downlink transmission corresponding to codepoint 5 was not received.

Still referring to FIG. 7, a second example is provided as follows. In this example, in the first communication 702, the BS 110*a* transmits four downlink communications to the UE 120*a* (e.g., k=4). The four downlink communications include: (i) a first downlink data transmission corresponding to codepoint 1, (ii) a second downlink data transmission corresponding to codepoint 4, (iii) a third downlink data transmission corresponding to codepoint 5, and (iv) a first downlink control transmission corresponding to codepoint 8. In this example, the UE 120*a* receives the downlink transmissions that correspond to codepoints 4, 5, and 8, but the UE 120*a* does not receive the downlink transmission corresponding to codepoint 1. Thus, in the first process 704, the UE 120a calculates a HARQ feedback based on the codepoints of the received downlink data transmissions resulting in 9.

The UE 120a then determines whether there is a downlink resource corresponding to a codepoint that could lead to ambiguity. In this example, because the UE 120a received transmissions corresponding to codepoints 4, 5, and 8, the UE 120a may determine that codepoint 1 would lead to ambiguity. That is, the UE 120a determines that if the BS 110a transmitted a downlink communication that was not received in a downlink resource that corresponds to codepoint 1, the HARQ feedback of 9 would result in an ambiguous HARQ feedback. The HARQ feedback would be ambiguous because the BS 110a would not be able to determine which of the transmissions were not received by the UE 120a (e.g., 1+8=9 and 4+5=9), so a HARQ feedback based on 9 could provide two different indications of what the UE 120a received. Thus, the UE 120a may determine that codepoint 1 is an ambiguity, and could make a HARQ feedback ambiguous if the BS 110a transmitted a downlink communication in a downlink resource corresponding to codepoint 1.

Based on the determination that codepoint 1 is an ambiguity, the UE 120a may determine a lowest codepoint value among the three codepoints corresponding to the received downlink transmissions and the ambiguous codepoint. In this example, because the lowest codepoint value is 1, and because the lowest codepoint value corresponds to the ambiguous codepoint, the UE 120a will set a q value to "1" (e.g., q=1).

In the second communication 706, the UE 120a transmits the determined HARQ feedback. In this example, the HARQ feedback comprises two values, (9,1), where the 9 is the HARQ feedback determined based on the received downlink data transmissions, and the 1 is the determined q value. At the second process 708, the BS 110a will determine which (if any) downlink transmission was not received by the UE based on the HARQ feedback. Here, the BS 110a may use the q value to determine that the downlink transmission corresponding to the lowest ambiguous codepoint value (e.g., 1) was not received by the UE 120a.

Figure 8:
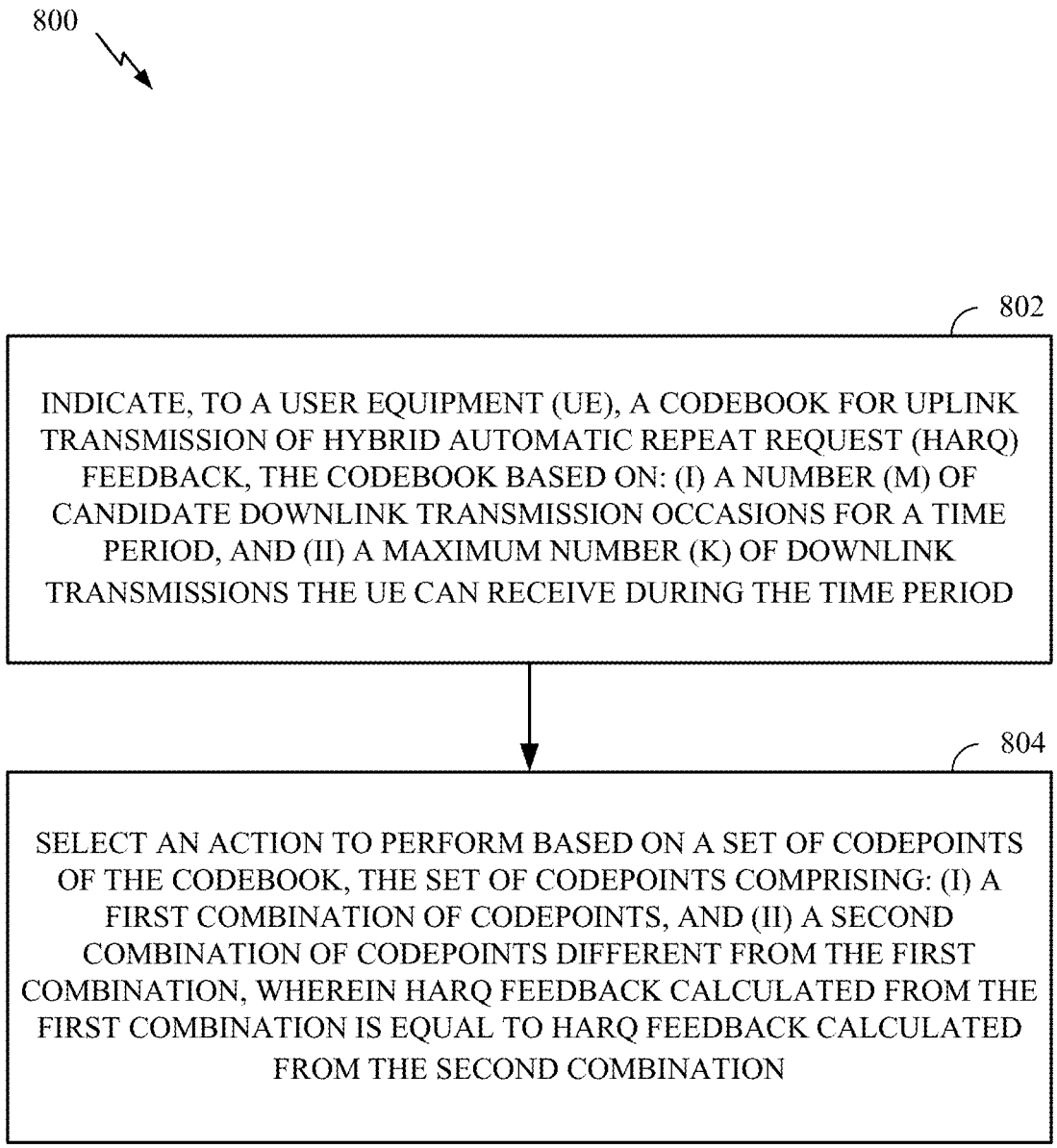
FIG. 8 is a flow diagram illustrating example operations for wireless communication, in accordance with certain aspects of the present disclosure.

FIG. 8 is a flow diagram illustrating example operations 800 for wireless communication, in accordance with certain aspects of the present disclosure. The operations 800 may be performed, for example, by a BS (e.g., such as the BS 110a in the wireless communication network 100). The operations 800 may be complimentary operations by the BS to the operations 800 performed by the UE. Operations 800 may be implemented as software components that are executed and run on one or more processors (e.g., controller/processor 240 of FIG. 2). Further, the transmission and reception of signals by the BS in operations 800 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 800 may begin, at a first block 802, by indicating, to a UE, a codebook for uplink transmission of HARQ feedback, the codebook based on: (i) a number (M) of candidate downlink transmission occasions for a time period, and (ii) a maximum number (k) of downlink transmissions the UE can receive during the time period.

The operations 800 may proceed to a second block 804 by selecting an action to perform based on a set of codepoints of the codebook, the set of codepoints comprising: (i) a first combination of codepoints, and (ii) a second combination of codepoints different from the first combination, wherein HARQ feedback calculated from the first combination is equal to HARQ feedback calculated from the second combination.

In certain aspects, the HARQ feedback is calculated from multiple codepoints, and wherein each of the multiple codepoints correspond to a unique one or more of the M candidate downlink transmission occasions.

In certain aspects, the selecting the action comprises scheduling, by the BS, a plurality of downlink data transmissions to the UE during the time period, wherein a codepoint of each of a plurality of downlink transmission occasions used for the plurality of downlink data transmissions do not correspond to the first combination of codepoints and the second combination of codepoints.

In certain aspects, the selecting the action comprises determining, by the BS, a first downlink transmission occasion in the time period for transmitting downlink data to the UE, wherein the determined first downlink transmission occasion in the time period corresponds to a codepoint in the set of codepoints; determining a likelihood that HARQ feedback calculated from the first combination will be equal to HARQ feedback calculated from the second combination; if the likelihood is below a threshold value, transmitting the downlink data to the UE using the first downlink transmission occasion; and if the likelihood is above the threshold value, refraining from transmitting the downlink data using the first downlink transmission occasion.

In certain aspects, the selecting the action comprises: determining, by the BS, a first downlink transmission occasion in the time period for transmitting downlink data to the UE, wherein the determined first downlink transmission occasion in the time period corresponds to a codepoint in the set of codepoints; transmitting the downlink data to the UE using the first downlink transmission occasion; and ignoring HARQ feedback received from the UE if the HARQ feedback is calculated from the first combination or the second combination.

In certain aspects, the codebook comprises a plurality of codepoints, and wherein each of the plurality of codepoints correspond to a unique binary vector with M elements having a weight less than or equal to k.

In certain aspects, the codebook comprises: a first plurality of codepoints for calculating HARQ feedback for downlink transmissions made over the time period, the first plurality of codepoints corresponding to: (i) downlink transmissions that include a plurality of downlink control information transmissions and (ii) a plurality of downlink data transmissions that do not correspond to either of the first combination of codepoints or the second combination of codepoints; a second plurality of codepoints for calculating HARQ feedback for downlink transmissions made over the time period, the second plurality of codepoints corresponding to: (i) downlink transmissions that include a plurality of downlink control information transmissions, and (ii) a plurality of downlink data transmissions that correspond to the first combination of codepoints; and a third plurality of codepoints for calculating HARQ feedback for downlink transmissions made over the time period, the third plurality of codepoints corresponding to: (i) downlink transmissions that include a plurality of downlink control information transmissions, and (ii) a plurality of downlink data transmissions that correspond to the second combination of codepoints.

In certain aspects, the first combination of codepoints includes a codepoint having a lowest value of codepoints in both the first combination and the second combination.

Figure 9:
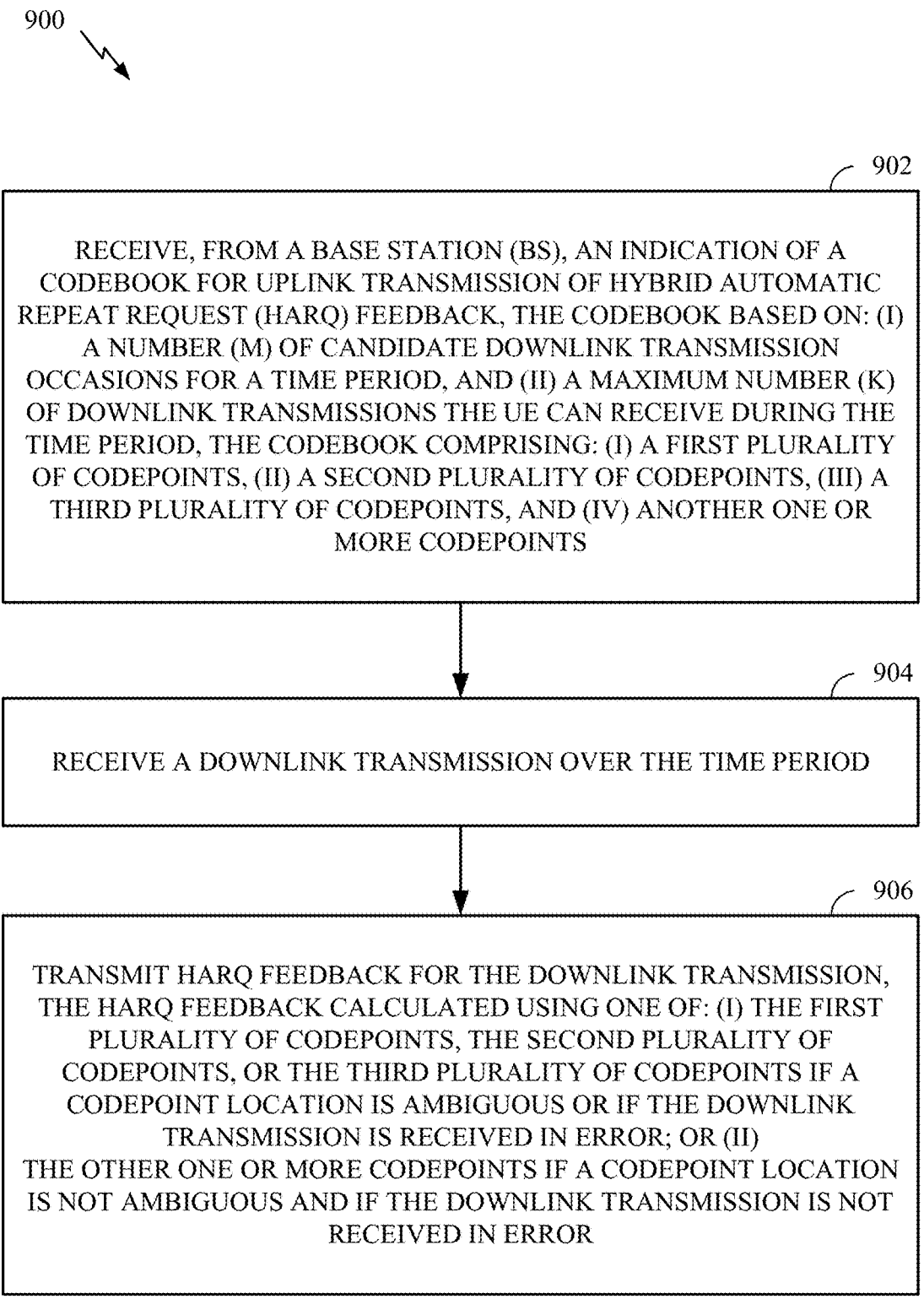
FIG. 9 is a flow diagram illustrating example operations for wireless communication, in accordance with certain aspects of the present disclosure.

FIG. 9 is a flow diagram illustrating example operations 900 for wireless communication, in accordance with certain aspects of the present disclosure. The operations 900 may be performed, for example, by UE (e.g., such as a UE 120*a* in the wireless communication network 100). The operations 900 may be complimentary operations by the UE to the operations 900 performed by the BS. Operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 900 may begin, at a first block 902, by receiving, from a base station (BS), an indication of a codebook for uplink transmission of hybrid automatic repeat request (HARQ) feedback, the codebook based on: (i) a number (M) of candidate downlink transmission occasions for a time period, and (ii) a maximum number (k) of downlink transmissions the UE can receive during the time period, the codebook comprising: (i) a first plurality of codepoints, (ii) a second plurality of codepoints, (iii) a third plurality of codepoints, and (iv) another one or more codepoints.

The operations 900 may proceed to a second block 904 by receiving a downlink transmission over the time period.

The operations 900 may proceed to a third block 906 by transmitting HARQ feedback for the downlink transmission, the HARQ feedback calculated using one of: the first plurality of codepoints, the second plurality of codepoints, or the third plurality of codepoints if a codepoint location is ambiguous or if the downlink transmission is received in error; or the other one or more codepoints if a codepoint location is not ambiguous and if the downlink transmission is not received in error.

In certain aspects, the codebook comprises a plurality of codepoints, and wherein each of the plurality of codepoints correspond to a unique binary vector with M elements having a weight less than or equal to k.

In certain aspects, receiving the downlink transmission over the time period further comprises receiving k−1 downlink transmissions over the time period, the method further comprising calculating a single HARQ feedback for an aggregation of the k−1 downlink transmissions.

In certain aspects, the operations 900 further include determining a single codepoint corresponding to each of the k−1 downlink transmissions, wherein the HARQ feedback is calculated based on a sum of codepoints corresponding to each of the k−1 downlink transmissions.

In certain aspects, the k−1 downlink transmissions over the time period includes one or more downlink control information transmissions and one or more downlink data transmissions.

In certain aspects, the operations 900 further include: determining codepoints, wherein each of the determined codepoints corresponds to one of the k−1 downlink transmissions; calculating an ambiguous codepoint based on the determined codepoints, wherein the combination of the ambiguous codepoint and the determined codepoints would result in a calculation of HARQ feedback that is true for two separate combinations of codepoints; determining which of the ambiguous codepoint and the determined codepoints has a lowest value; and selecting one of the second plurality of codepoints or the third plurality of codepoints based on which of the ambiguous codepoint and the determined codepoints has the lowest value.

In certain aspects, the operations 900 further include selecting the first plurality of codepoints for calculating HARQ feedback if one of: k−2 of the downlink transmissions are downlink control information transmissions; or k of the downlink transmissions are downlink control information transmissions.

Figure 10:
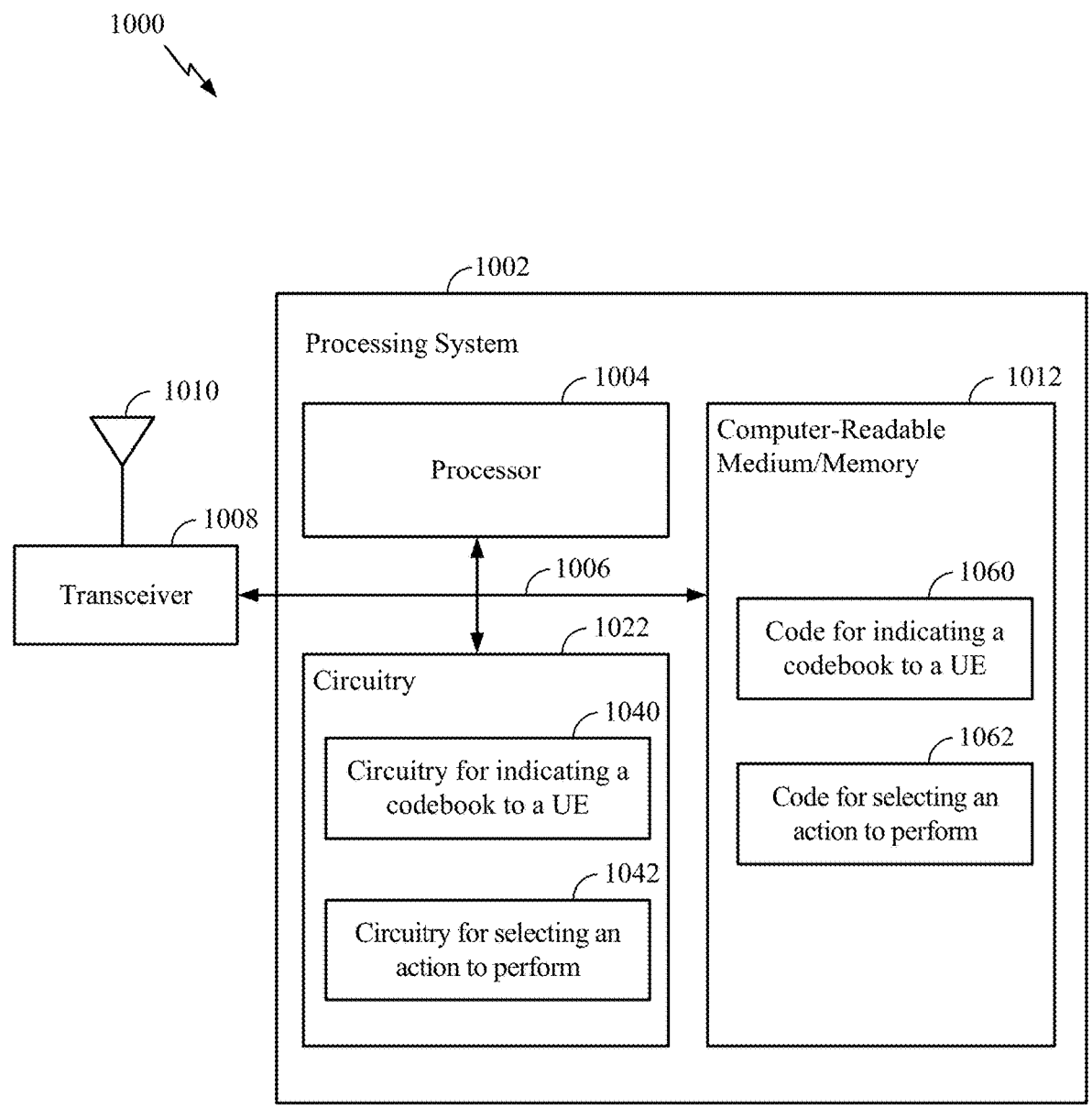
FIG. 10 illustrates a communications device that may include various components (e.g., corresponding to means-plus-function components) configured to perform operations for the techniques disclosed herein, such as the operations illustrated in FIG. 8, in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 8, or other operations for performing the various techniques discussed herein.

In certain aspects, computer-readable medium/memory 1012 stores code 1060 for indicating, to a user equipment (UE), a codebook for uplink transmission of hybrid automatic repeat request (HARQ) feedback, the codebook based on: (i) a number (M) of candidate downlink transmission occasions for a time period, and (ii) a maximum number (k) of downlink transmissions the UE can receive during the time period. In some examples, computer-readable medium/memory 1012 may optionally store code 1062 for selecting an action to perform based on a set of codepoints of the codebook, the set of codepoints comprising: (i) a first combination of codepoints, and (ii) a second combination of codepoints different from the first combination, wherein HARQ feedback calculated from the first combination is equal to HARQ feedback calculated from the second combination.

In certain aspects, the processor 1004 has circuitry 1022 configured to implement the code stored in the computer-readable medium/memory 1012. The processor 1004 includes circuitry 1040 for indicating, to a user equipment (UE), a codebook for uplink transmission of hybrid automatic repeat request (HARQ) feedback, the codebook based on: (i) a number (M) of candidate downlink transmission occasions for a time period, and (ii) a maximum number (k) of downlink transmissions the UE can receive during the time period. In some examples, the processor 1004 may optionally include circuitry 1042 for selecting an action to perform based on a set of codepoints of the codebook, the set of codepoints comprising: (i) a first combination of codepoints, and (ii) a second combination of codepoints different from the first combination, wherein HARQ feedback calculated from the first combination is equal to HARQ feedback calculated from the second combination.

Figure 11:
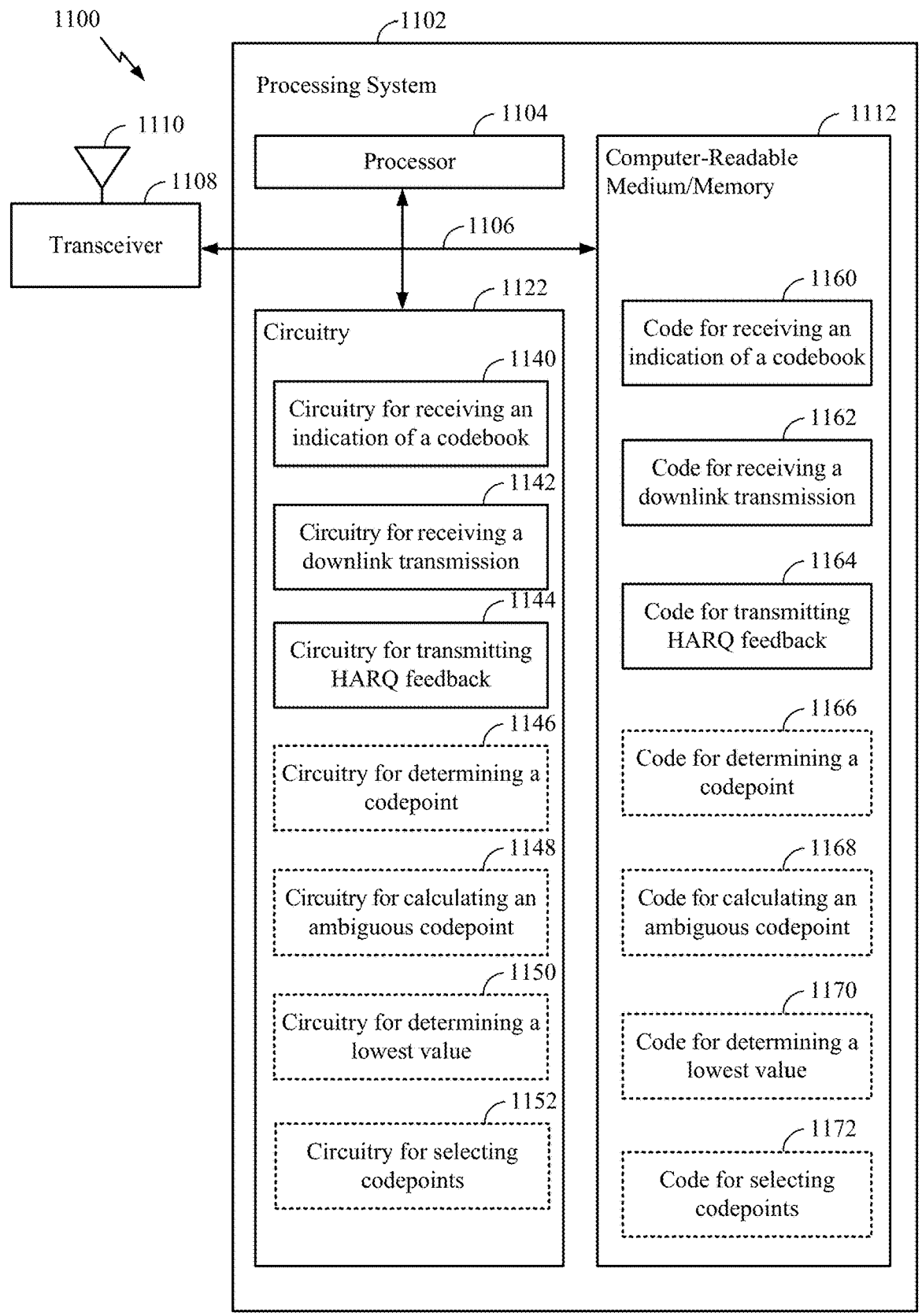
FIG. 11 illustrates a communications device that may include various components (e.g., corresponding to means-plus-function components) configured to perform operations for the techniques disclosed herein, such as the operations illustrated in FIG. 9, in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 9, or other operations for performing the various techniques discussed herein.

In certain aspects, computer-readable medium/memory 1112 stores code 1160 for receiving, from a base station (BS), an indication of a codebook for uplink transmission of hybrid automatic repeat request (HARQ) feedback, the codebook based on: (i) a number (M) of candidate downlink transmission occasions for a time period, and (ii) a maximum number (k) of downlink transmissions the UE can receive during the time period, the codebook comprising: (i) a first plurality of codepoints, (ii) a second plurality of codepoints, (iii) a third plurality of codepoints, and (iv) another one or more codepoints. Computer-readable medium/memory 1112 may also store code 1162 for receiving a downlink transmission over the time period. Computer-readable medium/memory 1112 may also store code 1164 for transmitting HARQ feedback for the downlink transmission, the HARQ feedback calculated using one of: the first plurality of codepoints, the second plurality of codepoints, or the third plurality of codepoints if a codepoint location is ambiguous or if the downlink transmission is received in error; or the other one or more codepoints if a codepoint location is not ambiguous and if the downlink transmission is not received in error.

The computer-readable medium/memory 1112 may optionally store code 1166 for determining a single codepoint corresponding to each of the k−1 downlink transmissions, wherein the HARQ feedback is calculated based on a sum of codepoints corresponding to each of the k−1 downlink transmissions.

The computer-readable medium/memory 1112 may optionally store code 1168 for calculating an ambiguous codepoint based on the determined codepoints, wherein the combination of the ambiguous codepoint and the determined codepoints would result in a calculation of HARQ feedback that is true for two separate combinations of codepoints.

The computer-readable medium/memory 1112 may optionally store code 1170 for determining which of the ambiguous codepoint and the determined codepoints has a lowest value.

The computer-readable medium/memory 1112 may optionally store code 1172 for selecting one of the second plurality of codepoints or the third plurality of codepoints based on which of the ambiguous codepoint and the determined codepoints has the lowest value.

In certain aspects, the processor 1104 has circuitry 1122 configured to implement the code stored in the computer-readable medium/memory 1112. In certain aspects, the processing system 1102 includes circuitry 1140 for receiving, from a base station (BS), an indication of a codebook for uplink transmission of hybrid automatic repeat request (HARQ) feedback, the codebook based on: (i) a number (M) of candidate downlink transmission occasions for a time period, and (ii) a maximum number (k) of downlink transmissions the UE can receive during the time period, the codebook comprising: (i) a first plurality of codepoints, (ii) a second plurality of codepoints, (iii) a third plurality of codepoints, and (iv) another one or more codepoints. The processing system 1102 includes circuitry 1142 for receiving a downlink transmission over the time period. The processing system 1102 includes circuitry 1144 for transmitting HARQ feedback for the downlink transmission, the HARQ feedback calculated using one of: the first plurality of codepoints, the second plurality of codepoints, or the third plurality of codepoints if a codepoint location is ambiguous or if the downlink transmission is received in error; or the other one or more codepoints if a codepoint location is not ambiguous and if the downlink transmission is not received in error.

The processing system 1102 includes circuitry 1146 for determining a single codepoint corresponding to each of the plurality of time periods, wherein the HARQ feedback is calculated based on a sum of codepoints corresponding to each of the plurality of time periods.

The processing system 1102 includes circuitry 1148 for calculating an ambiguous codepoint based on the determined codepoints, wherein the combination of the ambiguous codepoint and the determined codepoints would result in a calculation of HARQ feedback that is true for two separate combinations of codepoints.

The processing system 1102 includes circuitry 1150 for determining which of the ambiguous codepoint and the determined codepoints has a lowest value.

The processing system 1102 includes circuitry 1152 for selecting one of the second plurality of codepoints or the third plurality of codepoints based on which of the ambiguous codepoint and the determined codepoints has the lowest value.

Example Aspects

Implementation examples are described in the following numbered clauses:

1. A method for wireless communication by a base station (BS), the method comprising: indicating, to a user equipment (UE), a codebook for uplink transmission of hybrid automatic repeat request (HARQ) feedback, the codebook based on: (i) a number (M) of candidate downlink transmission occasions for a time period, and (ii) a maximum number (k) of downlink transmissions the UE can receive during the time period; and selecting an action to perform based on a set of codepoints of the codebook, the set of codepoints comprising: (i) a first combination of codepoints, and (ii) a second combination of codepoints different from the first combination, wherein HARQ feedback calculated from the first combination is equal to HARQ feedback calculated from the second combination.

2. The method of aspect 1, wherein the HARQ feedback is calculated from multiple codepoints, and wherein each of the multiple codepoints correspond to a unique one or more of the M candidate downlink transmission occasions.

3. The method of any of aspects 1 and 2, wherein the selecting the action comprises scheduling, by the BS, a plurality of downlink data transmissions to the UE during the time period, wherein a codepoint of each of a plurality of downlink transmission occasions used for the plurality of downlink data transmissions do not correspond to the first combination of codepoints and the second combination of codepoints.

4. The method of any of aspects 1-3, wherein the selecting the action comprises: determining, by the BS, a first downlink transmission occasion in the time period for transmitting downlink data to the UE, wherein the determined first downlink transmission occasion in the time period corresponds to a codepoint in the set of codepoints; determining a likelihood that HARQ feedback calculated from the first combination will be equal to HARQ feedback calculated from the second combination; if the likelihood is below a threshold value, transmitting the downlink data to the UE using the first downlink transmission occasion; and if the likelihood is above the threshold value, refraining from transmitting the downlink data using the first downlink transmission occasion.

5. The method of any of aspects 1-4, wherein the selecting the action comprises: determining, by the BS, a first downlink transmission occasion in the time period for transmitting downlink data to the UE, wherein the determined first downlink transmission occasion in the time period corresponds to a codepoint in the set of codepoints; transmitting the downlink data to the UE using the first downlink transmission occasion; and ignoring HARQ feedback received from the UE if the HARQ feedback is calculated from the first combination or the second combination.

6. The method of any of aspects 1-5, wherein the codebook comprises a plurality of codepoints, and wherein each of the plurality of codepoints correspond to a unique binary vector with M elements having a weight less than or equal to k.

7. The method of any of aspects 1-6, wherein the codebook comprises: a first plurality of codepoints for calculating HARQ feedback for downlink transmissions made over the time period, the first plurality of codepoints corresponding to: (i) downlink transmissions that include a plurality of downlink control information transmissions and (ii) a plurality of downlink data transmissions that do not correspond to either of the first combination of codepoints or the second combination of codepoints; a second plurality of codepoints for calculating HARQ feedback for downlink transmissions made over the time period, the second plurality of codepoints corresponding to: (i) downlink transmissions that include a plurality of downlink control information transmissions, and (ii) a plurality of downlink data transmissions that correspond to the first combination of codepoints; and a third plurality of codepoints for calculating HARQ feedback for downlink transmissions made over the time period, the third plurality of codepoints corresponding to: (i) downlink transmissions that include a plurality of downlink control information transmissions, and (ii) a plurality of downlink data transmissions that correspond to the second combination of codepoints.

8. The method of aspect 7, wherein the first combination of codepoints includes a codepoint having a lowest value of codepoints in both the first combination and the second combination.

9. A method for wireless communication by a user equipment (UE), the method comprising: receiving, from a base station (BS), an indication of a codebook for uplink transmission of hybrid automatic repeat request (HARQ) feedback, the codebook based on: (i) a number (M) of candidate downlink transmission occasions for a time period, and (ii) a maximum number (k) of downlink transmissions the UE can receive during the time period, the codebook comprising: (i) a first plurality of codepoints, (ii) a second plurality of codepoints, (iii) a third plurality of codepoints, and (iv) another one or more codepoints; receiving a downlink transmission over the time period; and transmitting HARQ feedback for the downlink transmission, the HARQ feedback calculated using one of: the first plurality of codepoints, the second plurality of codepoints, or the third plurality of codepoints if a codepoint location is ambiguous or if the downlink transmission is received in error; or the other one or more codepoints if a codepoint location is not ambiguous and if the downlink transmission is not received in error.

10. The method of aspects 9, wherein the codebook comprises a plurality of codepoints, and wherein each of the plurality of codepoints correspond to a unique binary vector with M elements having a weight less than or equal to k.

11. The method of any of aspects 9 and 10, wherein receiving the downlink transmission over the time period further comprises receiving k−1 downlink transmissions over the time period, the method further comprising calculating a single HARQ feedback for an aggregation of the k−1 downlink transmissions.

12. The method of any of aspects 9-11, further comprising determining a single codepoint corresponding to each of the k−1 downlink transmissions, wherein the HARQ feedback is calculated based on a sum of codepoints corresponding to each of the k−1 downlink transmissions.

13. The method of any of aspects 9-12, wherein the k−1 downlink transmissions over the time period includes one or more downlink control information transmissions and one or more downlink data transmissions.

14. The method of any of aspects 9-13, further comprising: determining codepoints, wherein each of the determined codepoints corresponds to one of the k−1 downlink transmissions; calculating an ambiguous codepoint based on the determined codepoints, wherein the combination of the ambiguous codepoint and the determined codepoints would result in a calculation of HARQ feedback that is true for two separate combinations of codepoints; determining which of the ambiguous codepoint and the determined codepoints has a lowest value; and selecting one of the second plurality of codepoints or the third plurality of codepoints based on which of the ambiguous codepoint and the determined codepoints has the lowest value.

15. The method of any of aspects 9-13, further comprising selecting the first plurality of codepoints for calculating HARQ feedback if one of: k−2 of the downlink transmissions are downlink control information transmissions; or k of the downlink transmissions are downlink control information transmissions.

16. A base station (BS), comprising: a memory; and a processor coupled to the memory, the processor and the memory configured to: indicate, to a user equipment (UE), a codebook for uplink transmission of hybrid automatic repeat request (HARQ) feedback, the codebook based on: (i) a number (M) of candidate downlink transmission occasions for a time period, and (ii) a maximum number (k) of downlink transmissions the UE can receive during the time period; and select an action to perform based on a set of codepoints of the codebook, the set of codepoints comprising: (i) a first combination of codepoints, and (ii) a second combination of codepoints different from the first combination, wherein HARQ feedback calculated from the first combination is equal to HARQ feedback calculated from the second combination.

17. The BS of aspect 16, wherein the HARQ feedback is calculated from multiple codepoints, and wherein each of the multiple codepoints correspond to a unique candidate downlink transmission occasion.

18. The BS of any of aspects 16 and 17, wherein the processor and the memory, being configured to select the action, are further configured to schedule a plurality of downlink data transmissions to the UE during the time period, wherein a codepoint of each of a plurality of downlink transmission occasions used for the plurality of downlink data transmissions does not correspond to the first combination of codepoints and the second combination of codepoints.

19. The BS of any of aspects 16-18, wherein the processor and the memory, being configured to select the action, are further configured to: determine a downlink transmission occasion in the time period for transmitting downlink data to the UE, wherein the downlink transmission occasion corresponds to a codepoint; determine a likelihood that HARQ feedback calculated from the first combination will be equal to HARQ feedback calculated from the second combination; if the likelihood is below a threshold value, transmit the downlink data to the UE using the downlink transmission occasion of the time period; and if the likelihood is above the threshold value, refrain from transmitting at least a portion of the downlink data to the UE.

20. The BS of any of aspects 16-19, wherein the processor and the memory, being configured to select the action, are further configured to: determine a downlink transmission occasion in the time period for transmitting downlink data to the UE, wherein the downlink transmission occasion corresponds to a codepoint; transmit the downlink data to the UE using the downlink transmission occasion of the time period; and ignore HARQ feedback received from the UE if the HARQ feedback is calculated from the first combination or the second combination.

21. The BS of any of aspects 16-20, wherein the codebook comprises a plurality of codepoints, and wherein each of the plurality of codepoints correspond to a unique binary vector with M elements having a weight less than or equal to k.

22. The BS of any of aspects 16-21, wherein the codebook comprises: a first plurality of codepoints for calculating HARQ feedback for downlink transmissions made over the time period, the first plurality of codepoints corresponding to: (i) downlink transmissions that include a plurality of downlink control information transmissions and (ii) a plurality of downlink data transmissions that do not correspond to either of the first combination of codepoints or the second combination of codepoints; a second plurality of codepoints for calculating HARQ feedback for downlink transmissions made over the time period, the second plurality of codepoints corresponding to: (i) downlink transmissions that include a plurality of downlink control information transmissions, and (ii) a plurality of downlink data transmissions that correspond to the first combination of codepoints; and a third plurality of codepoints for calculating HARQ feedback for downlink transmissions made over the time period, the third plurality of codepoints corresponding to: (i) downlink transmissions that include a plurality of downlink control information transmissions, and (ii) a plurality of downlink data transmissions that correspond to the second combination of codepoints.

23. The BS of any of aspects 16-22, wherein the first combination of codepoints includes a codepoint having a lowest value of codepoints in both the first combination and the second combination.

24. A user equipment (UE), comprising: a memory; and a processor coupled to the memory, the processor and the memory configured to: receive, from a base station (BS), an indication of a codebook for uplink transmission of hybrid automatic repeat request (HARQ) feedback, the codebook based on: (i) a number (M) of candidate downlink transmission occasions for a time period, and (ii) a maximum number (k) of downlink transmissions the UE can receive during the time period, the codebook comprising: (i) a first plurality of codepoints, (ii) a second plurality of codepoints, (iii) a third plurality of codepoints, and (iv) another one or more codepoints; receiving a downlink transmission over the time period; and transmit HARQ feedback for the downlink transmission, the HARQ feedback calculated using one of: the first plurality of codepoints, the second plurality of codepoints, or the third plurality of codepoints if a codepoint location is ambiguous or if the downlink transmission is received in error; or the other one or more codepoints if a codepoint location is not ambiguous and if the downlink transmission is not received in error.

25. The UE of aspect 24, wherein the codebook comprises a plurality of codepoints, and wherein each of the plurality of codepoints correspond to a unique binary vector with M elements having a weight less than or equal to k.

26. The UE of any of aspects 24 and 25, wherein the processor and the memory, being configured to receive the downlink transmission over the time period, are further configured to: receive k−1 downlink transmissions over the time period; and calculating a single HARQ feedback to an aggregation of the k−1 downlink transmissions.

27. The UE of any of aspects 24-26, wherein the processor and the memory are further configured to determine a single codepoint corresponding to each of the plurality of downlink transmission occasions, wherein the HARQ feedback is calculated based on a sum of codepoints corresponding to each of the downlink transmission occasions over which downlink data is transmitted.

28. The UE of any of aspects 24-27, wherein the k−1 downlink transmissions over the time period includes one or more downlink control information transmissions and one or more downlink data transmissions.

29. The UE of any of aspects 24-28, wherein the processor and the memory are further configured to: determine codepoints for each of the k−1 downlink transmissions; calculate an ambiguous codepoint based on the determined codepoints, wherein the combination of the ambiguous codepoint and the determined codepoints would result in a calculation of HARQ feedback that is true for two separate combinations of codepoints; determine which of the ambiguous codepoint and the determined codepoints has a lowest value; and select one of the second plurality of codepoints or the third plurality of codepoints based on which of the ambiguous codepoint and the determined codepoints has the lowest value.

30. The UE of any of aspects 24-29, wherein the processor and the memory are further configured to select the first plurality of codepoints for calculating HARQ feedback if one of: k−2 of the downlink transmissions are downlink control information transmissions; or k of the downlink transmissions are downlink control information transmissions.

ADDITIONAL CONSIDERATIONS

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CdMA2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 8 and/or FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a base station (BS), the method comprising:
   indicating, to a user equipment (UE), a codebook for uplink transmission of hybrid automatic repeat request (HARQ) feedback, the codebook based on: (i) a number (M) of candidate downlink transmission occasions for a time period, and (ii) a maximum number (k) of downlink transmissions the UE can receive during the time period, wherein the codebook includes a plurality of codepoints;
   determining a set of ambiguous codepoints of the plurality of codepoints, wherein the set of ambiguous codepoints includes a first combination of codepoints and a second combination of codepoints, wherein the second combination of codepoints is different from the first combination of codepoints, and wherein determining the set of ambiguous codepoints comprises determining the set of ambiguous codepoints based on first HARQ feedback calculated from the first combination of codepoints being equal to second HARQ feedback calculated from the second combination of codepoints; and
   selecting an action to perform for scheduling downlink data transmissions based on the set of ambiguous codepoints.

2. The method of claim 1, further comprising calculating the first HARQ feedback and the second HARQ feedback from multiple codepoints, wherein each of the multiple codepoints correspond to a unique one or more of the M candidate downlink transmission occasions.

3. The method of claim 1, wherein selecting the action comprises scheduling, by the BS, a plurality of downlink data transmissions to the UE during the time period, wherein a codepoint of each of a plurality of downlink transmission occasions used for the plurality of downlink data transmissions does not correspond to the first combination of codepoints and the second combination of codepoints.

4. The method of claim 1, wherein selecting the action comprises:
   determining, by the BS, a first downlink transmission occasion in the time period for transmitting downlink data to the UE, wherein the determined first downlink transmission occasion in the time period corresponds to a codepoint in the plurality of codepoints;
   determining a likelihood that the first HARQ feedback calculated from the first combination will be equal to the second HARQ feedback calculated from the second combination;
   if the likelihood is below a threshold value, transmitting the downlink data to the UE using the first downlink transmission occasion; and
   if the likelihood is above the threshold value, refraining from transmitting the downlink data using the first downlink transmission occasion.

5. The method of claim 1, wherein selecting the action comprises:
   determining, by the BS, a first downlink transmission occasion in the time period for transmitting downlink data to the UE, wherein the determined first downlink transmission occasion in the time period corresponds to a codepoint in the plurality of codepoints;
   transmitting the downlink data to the UE using the first downlink transmission occasion; and
   ignoring HARQ feedback received from the UE if the HARQ feedback is calculated from the first combination of codepoints or the second combination of codepoints.

6. The method of claim 1, wherein each of the plurality of codepoints correspond to a unique binary vector with M elements having a weight less than or equal to k.

7. The method of claim 1, wherein the plurality of codepoints comprises:
   a first plurality of codepoints for calculating HARQ feedback for downlink transmissions made over the time period, the first plurality of codepoints corresponding to: (i) downlink transmissions that include a plurality of downlink control information transmissions and (ii) a plurality of downlink data transmissions that do not correspond to either of the first combination of codepoints or the second combination of codepoints;
   a second plurality of codepoints for calculating HARQ feedback for downlink transmissions made over the time period, the second plurality of codepoints corresponding to: (i) downlink transmissions that include a plurality of downlink control information transmissions, and (ii) a plurality of downlink data transmissions that correspond to the first combination of codepoints; and a third plurality of codepoints for calculating HARQ feedback for downlink transmissions made over the time period, the third plurality of codepoints corresponding to: (i) downlink transmissions that include a plurality of downlink control information transmissions, and (ii) a plurality of downlink data transmissions that correspond to the second combination of codepoints.

8. The method of claim 7, wherein the first combination of codepoints includes a codepoint having a lowest value of codepoints in both the first combination of codepoints and the second combination of codepoints.

9. A method for wireless communication by a user equipment (UE), the method comprising:
receiving, from a base station (BS), an indication of a codebook for uplink transmission of hybrid automatic repeat request (HARQ) feedback, the codebook based on: (i) a number (M) of candidate downlink transmission occasions for a time period, and (ii) a maximum number (k) of downlink transmissions the UE can receive during the time period, the codebook comprising: (i) a first plurality of codepoints, (ii) a second plurality of codepoints, (iii) a third plurality of codepoints, and (iv) another one or more codepoints;
receiving a downlink transmission over the time period; and
transmitting HARQ feedback for the downlink transmission, the HARQ feedback calculated using the first plurality of codepoints, the second plurality of codepoints, or the third plurality of codepoints if a codepoint location is ambiguous, wherein the codepoint location is ambiguous based on first HARQ feedback calculated from the codepoint location being equal to second HARQ feedback calculated from another codepoint location.

10. The method of claim 9, wherein the codebook comprises a plurality of codepoints, and wherein each of the plurality of codepoints correspond to a unique binary vector with M elements having a weight less than or equal to k.

11. The method of claim 9, wherein receiving the downlink transmission over the time period further comprises receiving k−1 downlink transmissions over the time period, the method further comprising calculating a single HARQ feedback for an aggregation of the k−1 downlink transmissions.

12. The method of claim 11, further comprising determining a single codepoint corresponding to each of the k−1 downlink transmissions, wherein the HARQ feedback is calculated based on a sum of codepoints corresponding to each of the k−1 downlink transmissions.

13. The method of claim 11, wherein the k−1 downlink transmissions over the time period includes one or more downlink control information transmissions and one or more downlink data transmissions.

14. The method of claim 13, further comprising:
determining codepoints, wherein each of the determined codepoints corresponds to one of the k−1 downlink transmissions;
calculating an ambiguous codepoint based on the determined codepoints, wherein the combination of the ambiguous codepoint and the determined codepoints would result in a calculation of HARQ feedback that is true for two separate combinations of codepoints;
determining which of the ambiguous codepoint and the determined codepoints has a lowest value; and
selecting one of the second plurality of codepoints or the third plurality of codepoints based on which of the ambiguous codepoint and the determined codepoints has the lowest value.

15. The method of claim 9, further comprising selecting the first plurality of codepoints for calculating HARQ feedback if one of:
k−2 of the downlink transmissions are downlink control information transmissions; or
k of the downlink transmissions are downlink control information transmissions.

16. A base station (BS), comprising:
a memory; and
a processor coupled to the memory, the processor and the memory configured to:
indicate, to a user equipment (UE), a codebook for uplink transmission of hybrid automatic repeat request (HARQ) feedback, the codebook based on: (i) a number (M) of candidate downlink transmission occasions for a time period, and (ii) a maximum number (k) of downlink transmissions the UE can receive during the time period, wherein the codebook includes a plurality of codepoints;
determine a set of ambiguous codepoints of the plurality of codepoints, wherein the set of ambiguous codepoints includes a first combination of codepoints and a second combination of codepoints, wherein the second combination of codepoints is different from the first combination of codepoints, and wherein to determine the set of ambiguous codepoints, the processor is configured to determine the set of ambiguous codepoints based on HARQ feedback calculated from the first combination of codepoints being equal to HARQ feedback calculated from the second combination of codepoints; and
select an action to perform for scheduling downlink data transmissions based on the set of ambiguous codepoints.

17. The BS of claim 16, wherein the processors is further configured to calculate the first HARQ feedback and the second HARQ feedback from multiple codepoints, wherein each of the multiple codepoints correspond to a unique candidate downlink transmission occasion.

18. The BS of claim 16, wherein the processor and the memory, being configured to select the action, are further configured to schedule a plurality of downlink data transmissions to the UE during the time period, wherein a codepoint of each of a plurality of downlink transmission occasions used for the plurality of downlink data transmissions does not correspond to the first combination of codepoints and the second combination of codepoints.

19. The BS of claim 16, wherein the processor and the memory, being configured to select the action, are further configured to:
determine a downlink transmission occasion in the time period for transmitting downlink data to the UE, wherein the downlink transmission occasion corresponds to a codepoint in the plurality of codepoints;
determine a likelihood that the first HARQ feedback calculated from the first combination will be equal to the second HARQ feedback calculated from the second combination;
if the likelihood is below a threshold value, transmit the downlink data to the UE using the downlink transmission occasion of the time period; and if the likelihood is above the threshold value, refrain from transmitting at least a portion of the downlink data to the UE.

20. The BS of claim 16, wherein the processor and the memory, being configured to select the action, are further configured to:
   determine a downlink transmission occasion in the time period for transmitting downlink data to the UE, wherein the downlink transmission occasion corresponds to a codepoint in the plurality of codepoints;
   transmit the downlink data to the UE using the downlink transmission occasion of the time period; and
   ignore HARQ feedback received from the UE if the HARQ feedback is calculated from the first combination of codepoints or the second combination of codepoints.

21. The BS of claim 16, wherein each of the plurality of codepoints correspond to a unique binary vector with M elements having a weight less than or equal to k.

22. The BS of claim 16, wherein the plurality of codepoints comprises:
   a first plurality of codepoints for calculating HARQ feedback for downlink transmissions made over the time period, the first plurality of codepoints corresponding to: (i) downlink transmissions that include a plurality of downlink control information transmissions and (ii) a plurality of downlink data transmissions that do not correspond to either of the first combination of codepoints or the second combination of codepoints;
   a second plurality of codepoints for calculating HARQ feedback for downlink transmissions made over the time period, the second plurality of codepoints corresponding to: (i) downlink transmissions that include a plurality of downlink control information transmissions, and (ii) a plurality of downlink data transmissions that correspond to the first combination of codepoints; and
   a third plurality of codepoints for calculating HARQ feedback for downlink transmissions made over the time period, the third plurality of codepoints corresponding to: (i) downlink transmissions that include a plurality of downlink control information transmissions, and (ii) a plurality of downlink data transmissions that correspond to the second combination of codepoints.

23. The BS of claim 22, wherein the first combination of codepoints includes a codepoint having a lowest value of codepoints in both the first combination of codepoints and the second combination of codepoints.

24. A user equipment (UE), comprising:
   a memory; and
   a processor coupled to the memory, the processor and the memory configured to:
     receive, from a base station (BS), an indication of a codebook for uplink transmission of hybrid automatic repeat request (HARQ) feedback, the codebook based on: (i) a number (M) of candidate downlink transmission occasions for a time period, and (ii) a maximum number (k) of downlink transmissions the UE can receive during the time period, the codebook comprising: (i) a first plurality of codepoints, (ii) a second plurality of codepoints, (iii) a third plurality of codepoints, and (iv) another one or more codepoints;
     receive a downlink transmission over the time period; and
     transmit HARQ feedback for the downlink transmission, the HARQ feedback calculated using the first plurality of codepoints, the second plurality of codepoints, or the third plurality of codepoints if a codepoint location is ambiguous, wherein the codepoint location is ambiguous based on first HARQ feedback calculated from the codepoint location being equal to second HARQ feedback calculated from another codepoint location.

25. The UE of claim 24, wherein the codebook comprises a plurality of codepoints, and wherein each of the plurality of codepoints correspond to a unique binary vector with M elements having a weight less than or equal to k.

26. The UE of claim 24, wherein the processor and the memory, being configured to receive the downlink transmission over the time period, are further configured to:
   receive k−1 downlink transmissions over the time period; and
   calculating a single HARQ feedback to an aggregation of the k−1 downlink transmissions.

27. The UE of claim 26, wherein the processor and the memory are further configured to determine a single codepoint corresponding to each of the plurality of downlink transmission occasions, wherein the HARQ feedback is calculated based on a sum of codepoints corresponding to each of the downlink transmission occasions over which downlink data is transmitted.

28. The UE of claim 26, wherein the k−1 downlink transmissions over the time period includes one or more downlink control information transmissions and one or more downlink data transmissions.

29. The UE of claim 28, wherein the processor and the memory are further configured to:
   determine codepoints for each of the k−1 downlink transmissions;
   calculate an ambiguous codepoint based on the determined codepoints, wherein the combination of the ambiguous codepoint and the determined codepoints would result in a calculation of HARQ feedback that is true for two separate combinations of codepoints;
   determine which of the ambiguous codepoint and the determined codepoints has a lowest value; and
   select one of the second plurality of codepoints or the third plurality of codepoints based on which of the ambiguous codepoint and the determined codepoints has the lowest value.

30. The UE of claim 24, wherein the processor and the memory are further configured to select the first plurality of codepoints for calculating HARQ feedback if one of:
   k−2 of the downlink transmissions are downlink control information transmissions; or
   k of the downlink transmissions are downlink control information transmissions.

* * * * *